(12) United States Patent
Garcia Martin et al.

(10) Patent No.: US 10,512,020 B2
(45) Date of Patent: Dec. 17, 2019

(54) METHODS AND DEVICES FOR ACCESS NETWORK SELECTION

(71) Applicant: Telefonaktiebolaget LM Ericsson (publ), Stockholm (SE)

(72) Inventors: Miguel Angel Garcia Martin, Madrid (ES); Pablo Martinez De La Cruz, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 89 days.

(21) Appl. No.: 15/534,946

(22) PCT Filed: Dec. 16, 2014

(86) PCT No.: PCT/EP2014/078046
§ 371 (c)(1),
(2) Date: Jun. 9, 2017

(87) PCT Pub. No.: WO2016/095974
PCT Pub. Date: Jun. 23, 2016

(65) Prior Publication Data
US 2018/0270732 A1    Sep. 20, 2018

(51) Int. Cl.
*H04W 36/32* (2009.01)
*H04W 48/04* (2009.01)
(Continued)

(52) U.S. Cl.
CPC ....... *H04W 36/32* (2013.01); *H04W 36/0016* (2013.01); *H04W 36/08* (2013.01);
(Continued)

(58) Field of Classification Search
None
See application file for complete search history.

(56) References Cited

U.S. PATENT DOCUMENTS

2011/0310867 A1    12/2011  Kennedy et al.
2012/0327797 A1*   12/2012  Siomina ................ H04W 36/30
                                                    370/252
(Continued)

FOREIGN PATENT DOCUMENTS

WO    WO 2011 149533 A1    12/2011
WO    WO-2011160682 A1 *   12/2011    ............ H04W 36/32

OTHER PUBLICATIONS

3GPP TS 24.312 v12.5.0; Technical Specification; 3rd Generation Partnership Project; Technical Specification Group Core Network and Terminals; Access Network Discovery and Selection Function (ANDSF) Management Object (MO) (Release 12)—Jun. 2014.
(Continued)

*Primary Examiner* — Noel R Beharry
*Assistant Examiner* — Ruihua Zhang
(74) *Attorney, Agent, or Firm* — Baker Botts, LLP

(57) ABSTRACT

A method is provided that includes defining at an ANDSF server an ANDSF rule that includes a validity condition to be fulfilled. The validity condition includes a validity location area and a validity trajectory towards the validity location area, and the validity trajectory includes a list with one or more previous location areas. The method also includes transmitting the ANDSF rule from the ANDSF server to an ANDSF client of the UE; tracking, at the ANDSF client, a historical trajectory for the UE by storing a list with one or more successive location areas where the UE has been located; and upon matching a current location of the UE with the validity location area, and the tracked historical trajectory for the UE with the validity trajectory, determining that the validity condition is fulfilled and applying the ANDSF rule at the ANDSF client.

31 Claims, 17 Drawing Sheets

(51) Int. Cl.
*H04W 48/14* (2009.01)
*H04W 36/08* (2009.01)
*H04W 36/00* (2009.01)
*H04W 36/24* (2009.01)

(52) U.S. Cl.
CPC ......... *H04W 36/245* (2013.01); *H04W 48/04* (2013.01); *H04W 48/14* (2013.01)

(56) References Cited

U.S. PATENT DOCUMENTS

| | | | | |
|---|---|---|---|---|
| 2013/0142042 A1* | 6/2013 | Garcia Martin | .... | H04L 12/5692 370/230 |
| 2014/0295913 A1 | 10/2014 | Gupta | | |
| 2015/0215832 A1* | 7/2015 | Fitzpatrick | ............ | H04W 48/18 455/426.1 |
| 2016/0029264 A1* | 1/2016 | Jang | ...................... | H04W 48/18 370/331 |
| 2016/0212653 A1* | 7/2016 | Wang | .................. | A61B 10/0051 |

OTHER PUBLICATIONS

3GPP TS 23.402 v12.5.0; Technical Specification; 3rd Generation Partnership Project; Technical Specification Group Services and System Aspects; Architecture Enhancements for non-3GPP Accesses (Release 12)—Jun. 2014.

PCT International Search Report for International application No. PCT/EP2014/078046—dated Aug. 31, 2015.

3GPP TS 24.302 v12.5.0; Technical Specification; 3rd Generation Partnership Project; Technical Specification Group Core Network and Terminals; Access to the 3GPP Evolved Packet Core (EPC) via non-3GPP Access Networks; Stage 3 (Release 12)—Jun. 2014.

PCT Written Opinion of the International Searching Authority for International application No. PCT/EP2014/078046—dated Aug. 31, 2015.

* cited by examiner

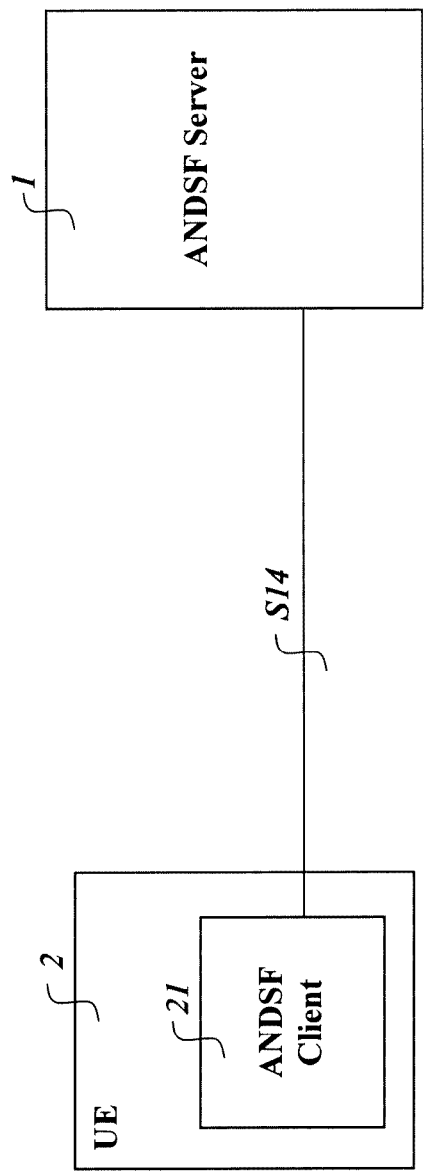
FIG. -1-

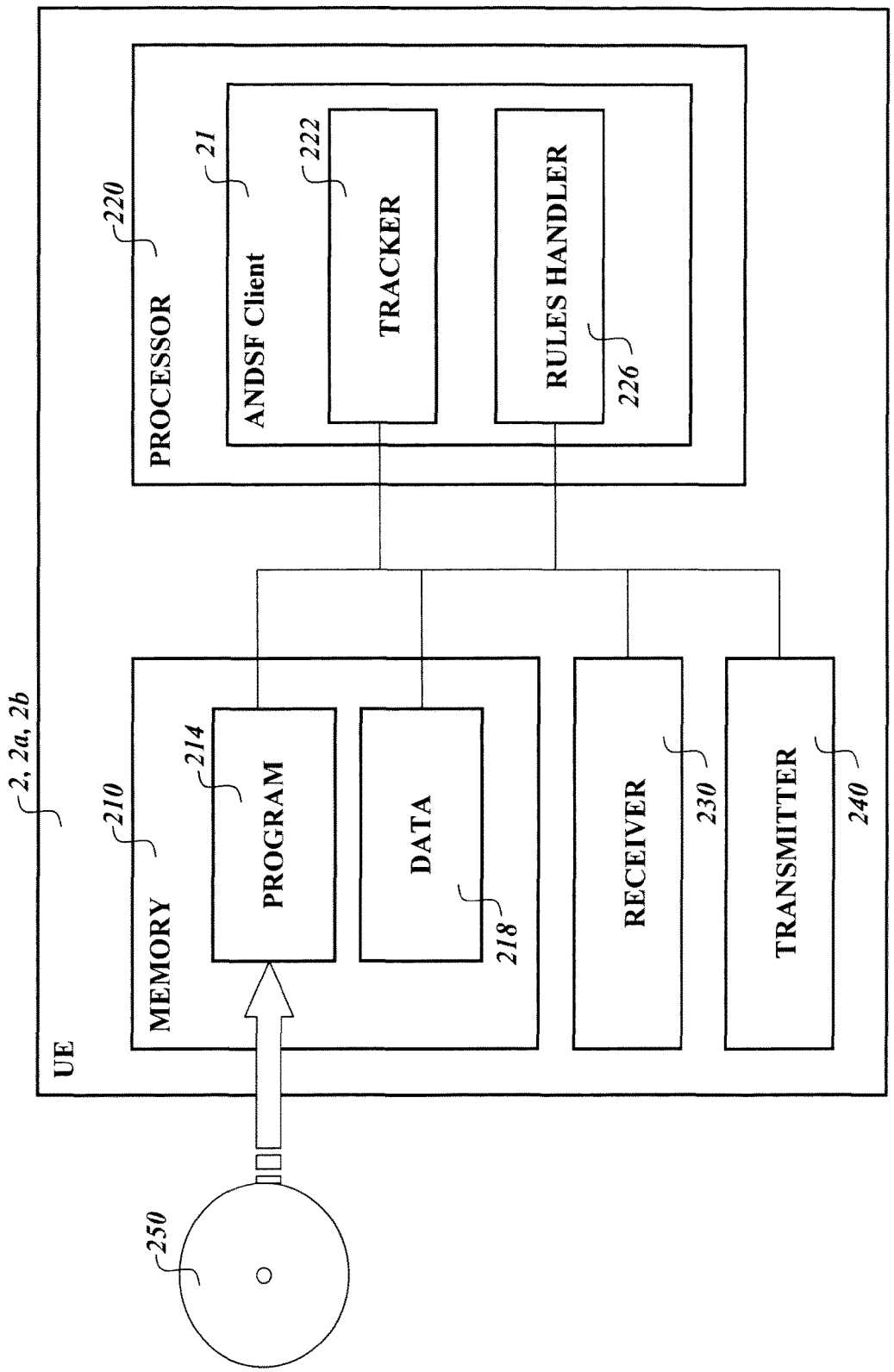
FIG. -2-

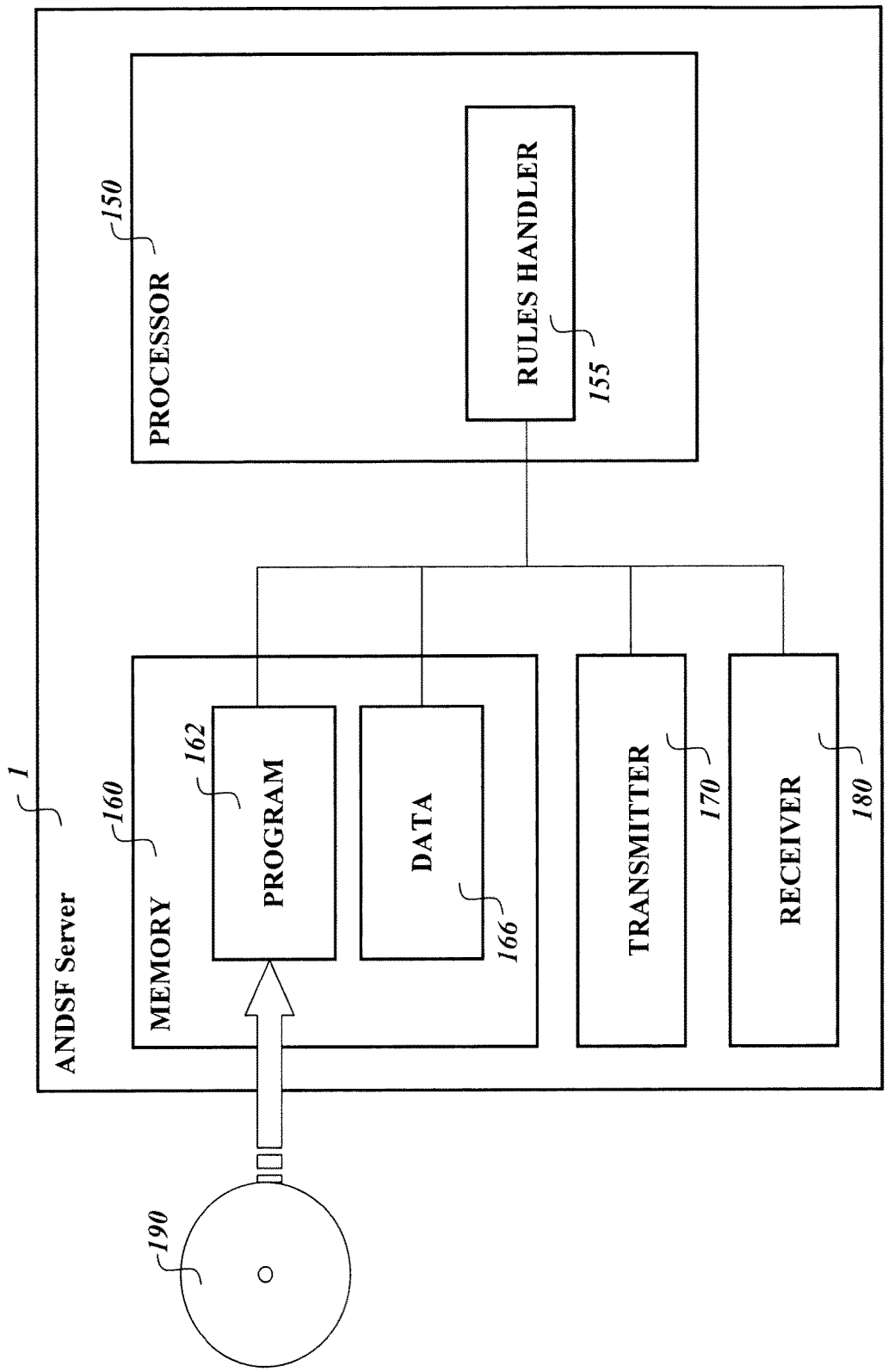
FIG. -3-

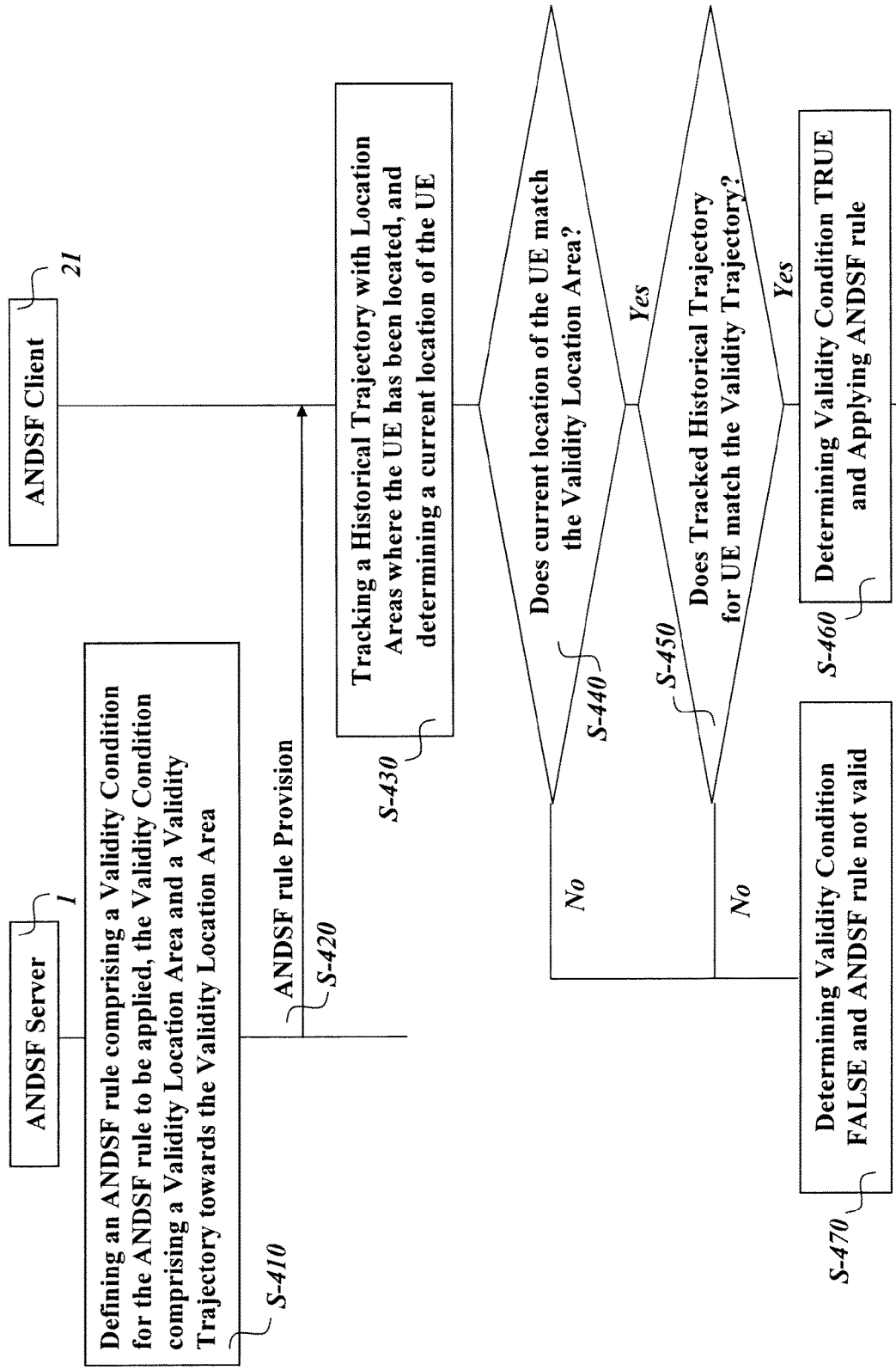

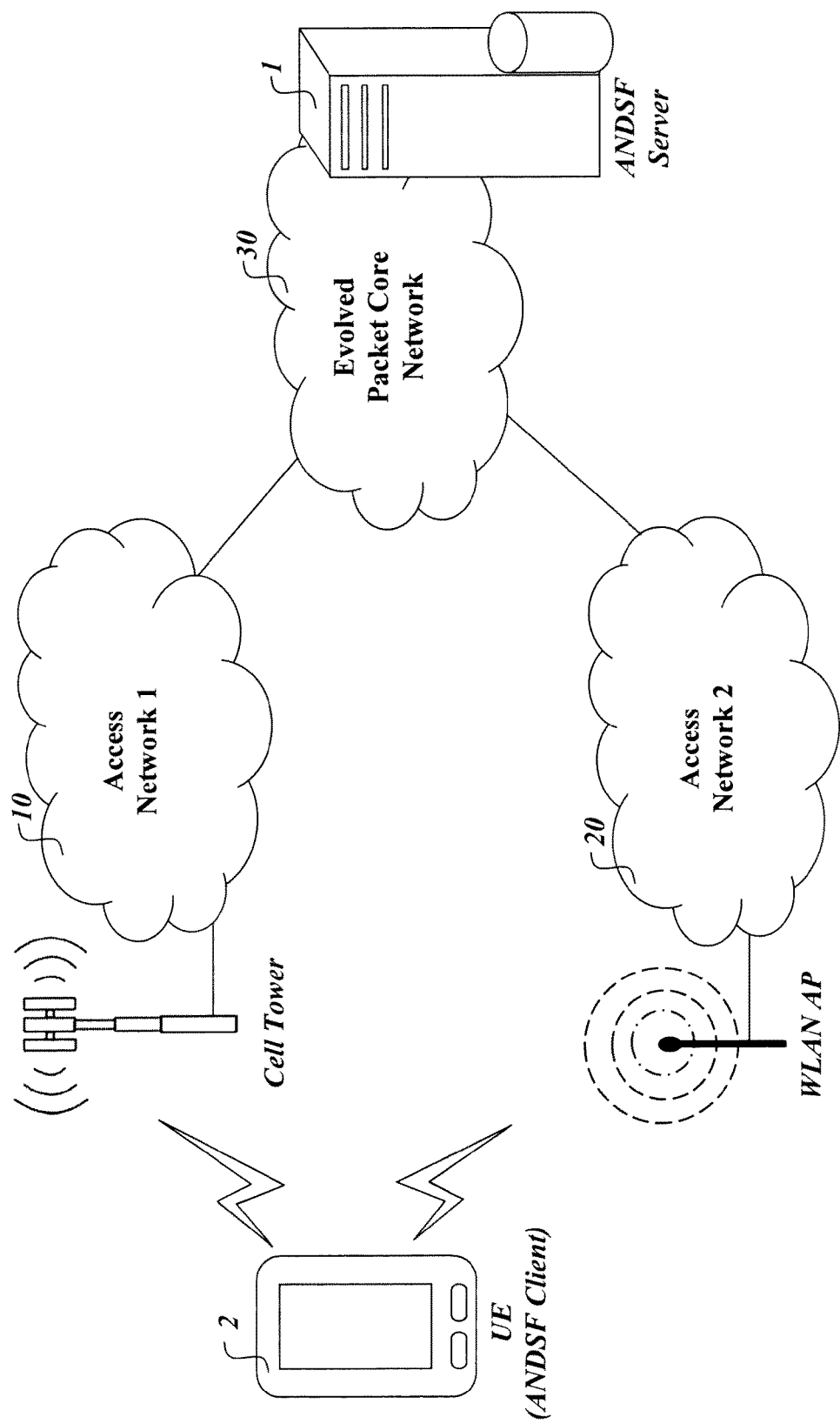
FIG. -5-

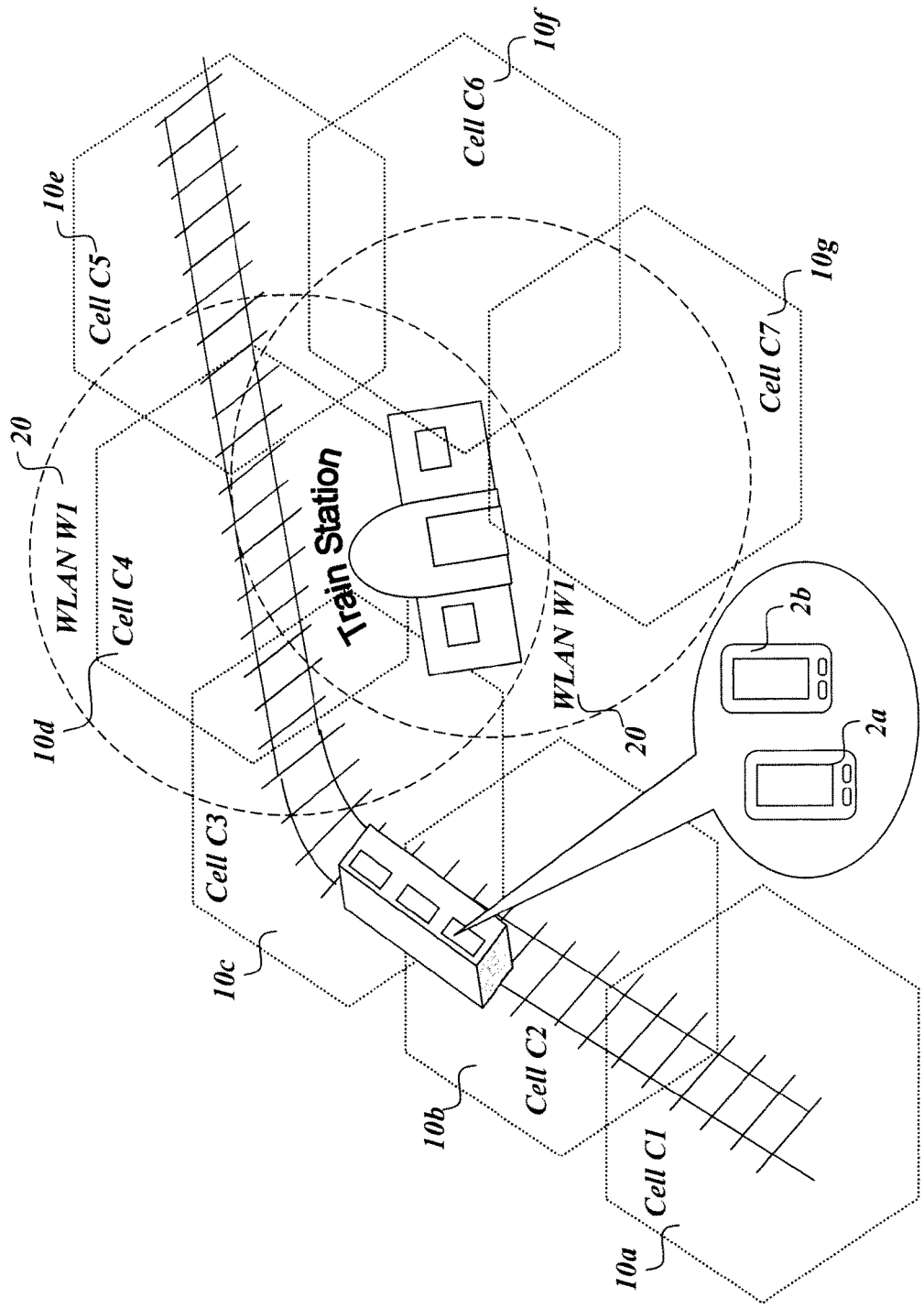
FIG. -6-

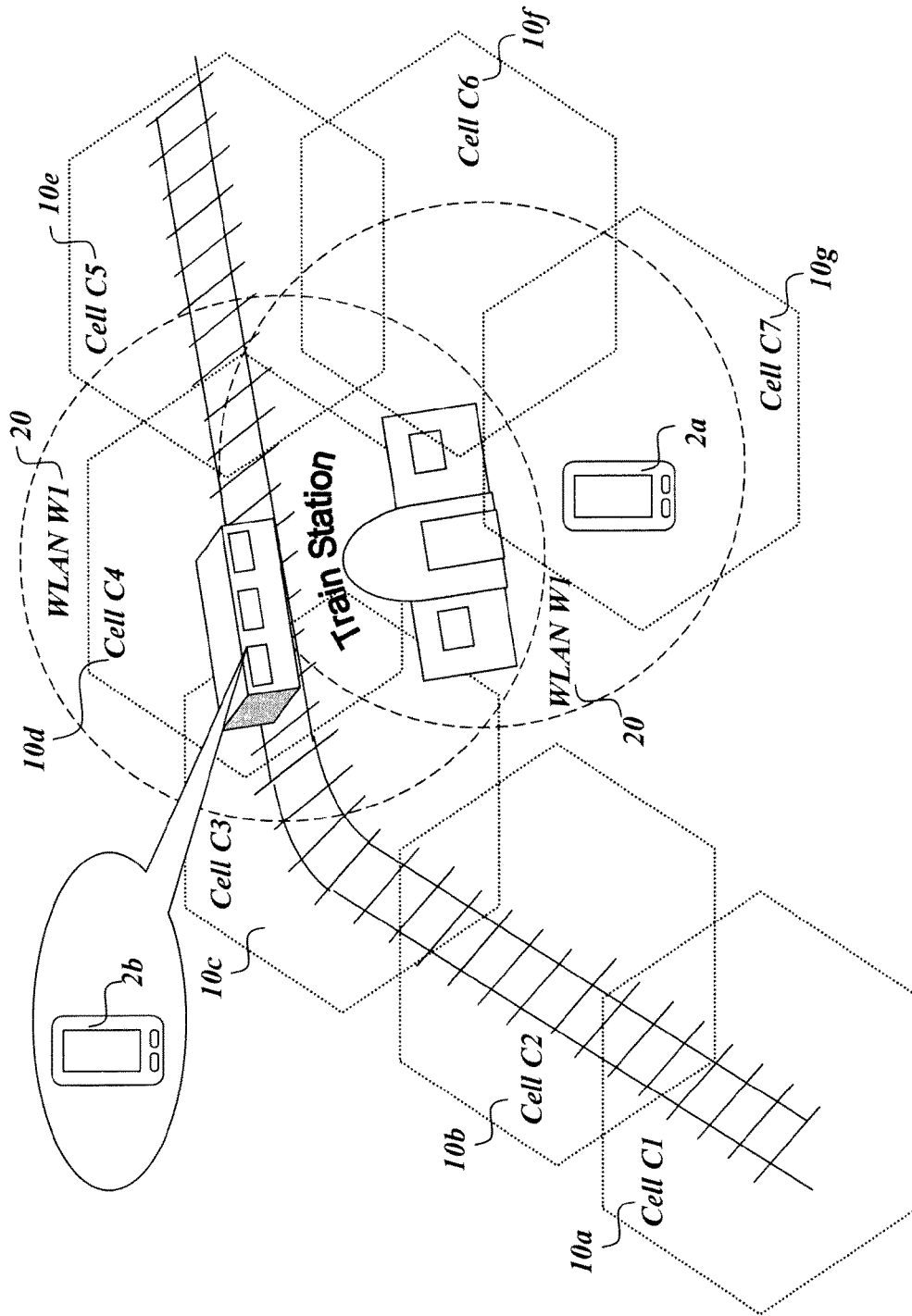
FIG. -7-

| Cell # | Technology | PLMN | LAC | Cell ID |
|---|---|---|---|---|
| C1 | UTRAN | 214 | 2828 | 00231 |
| C2 | UTRAN | 214 | 2828 | 00154 |
| C3 | UTRAN | 214 | 2828 | 04223 |
| C4 | UTRAN | 214 | 2828 | 20192 |
| C5 | UTRAN | 214 | 2828 | 12031 |
| C6 | UTRAN | 214 | 2828 | 55512 |

FIG. -8-

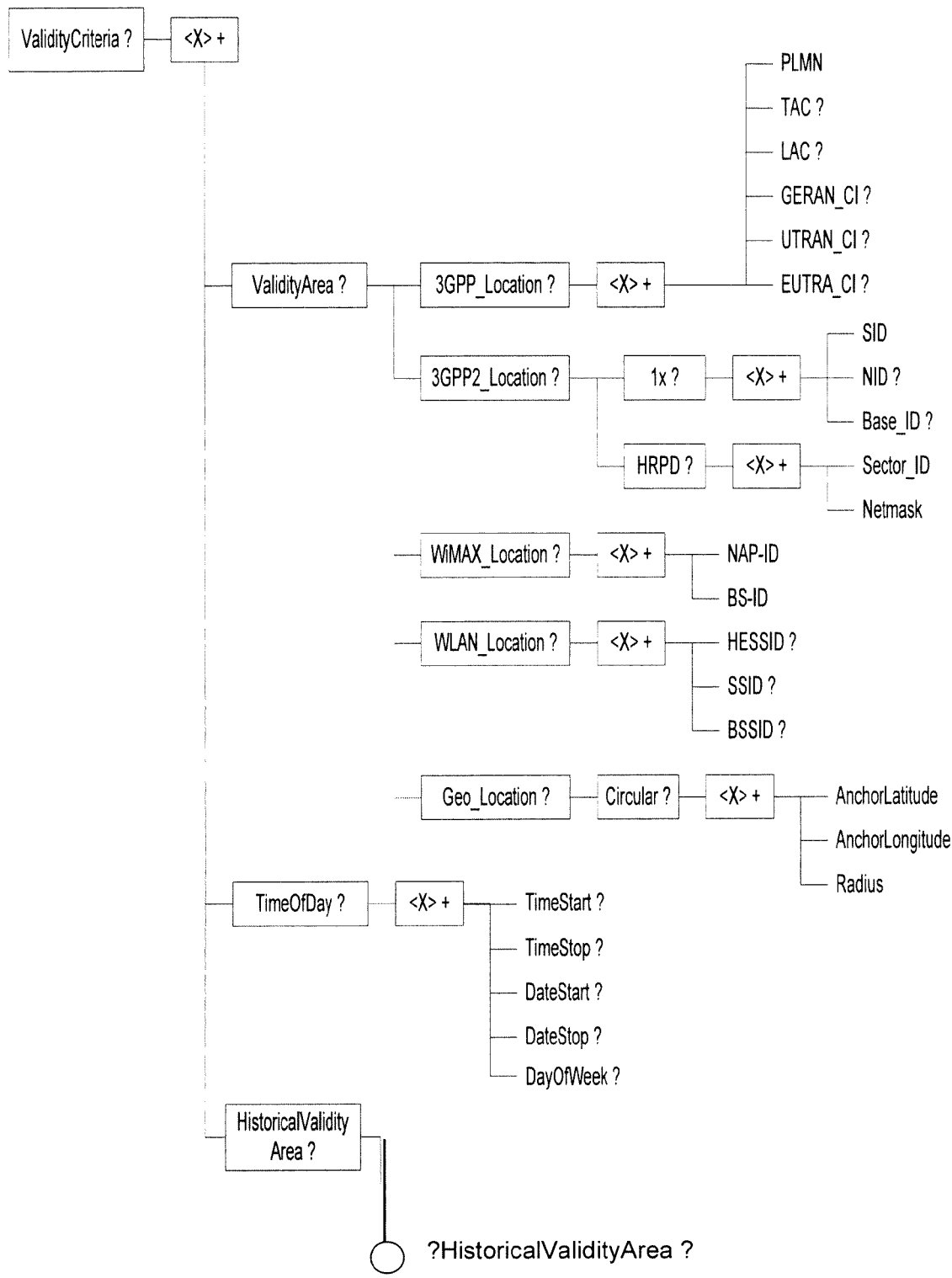
FIG.-9-

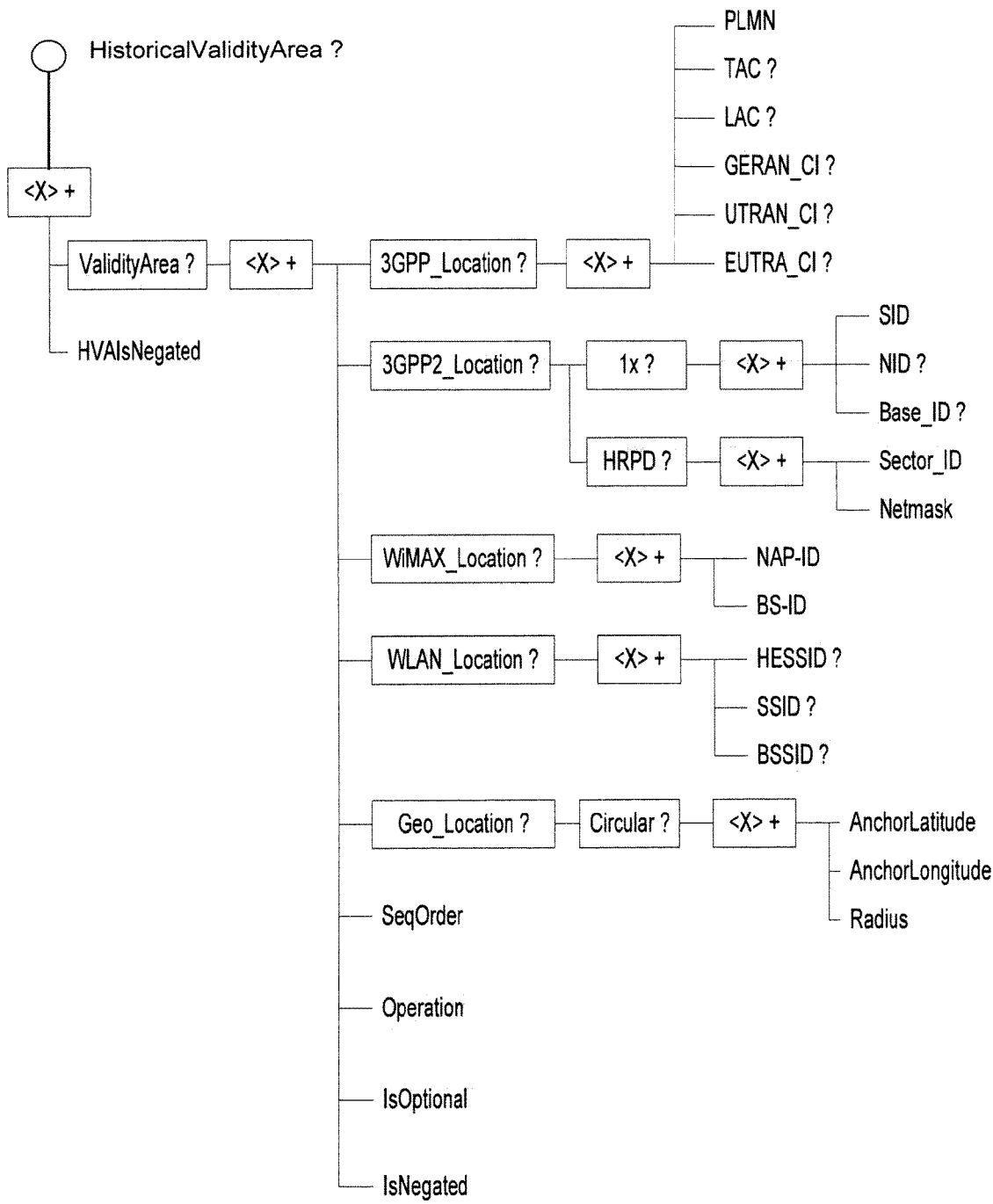
FIG.-10-

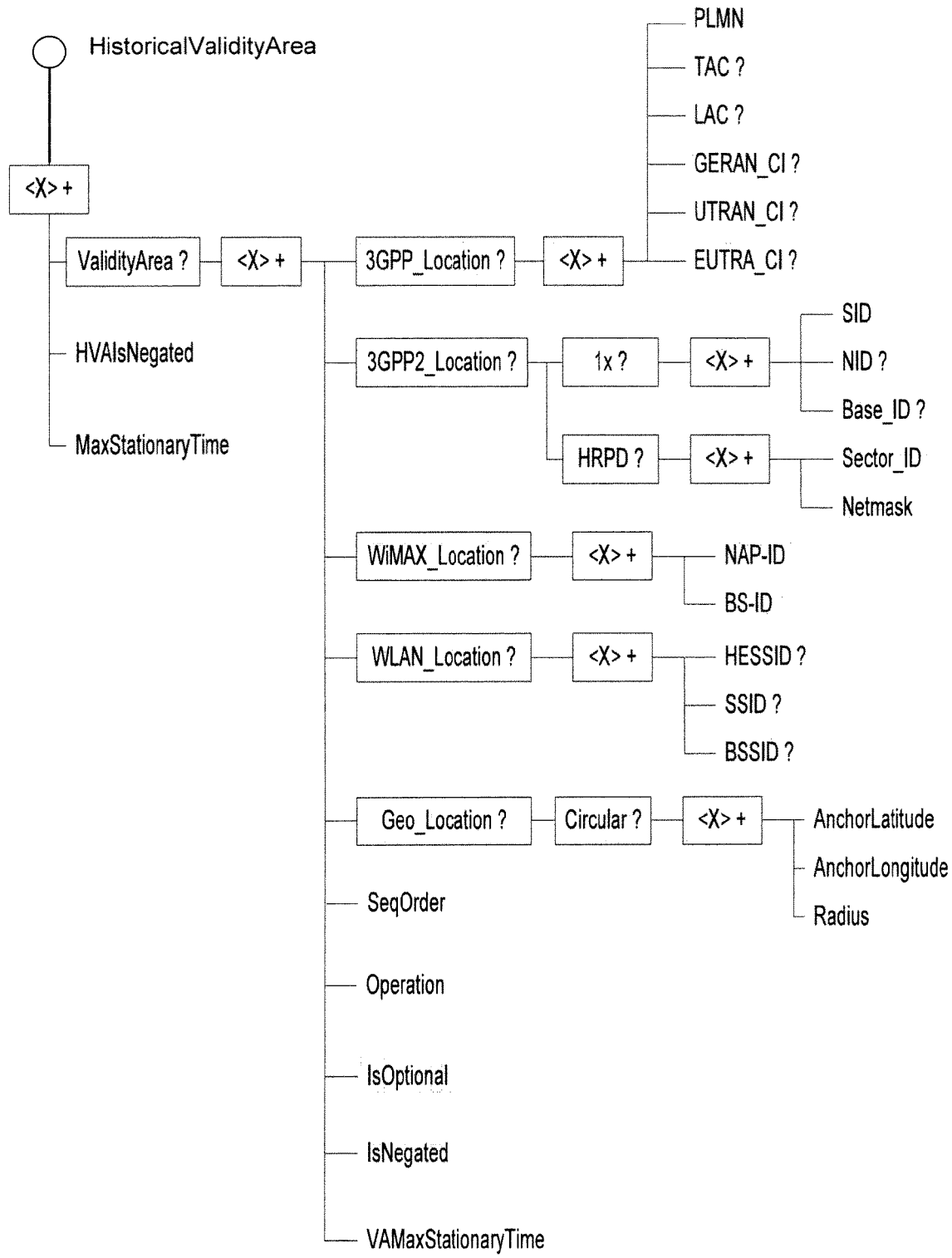
FIG.-11-

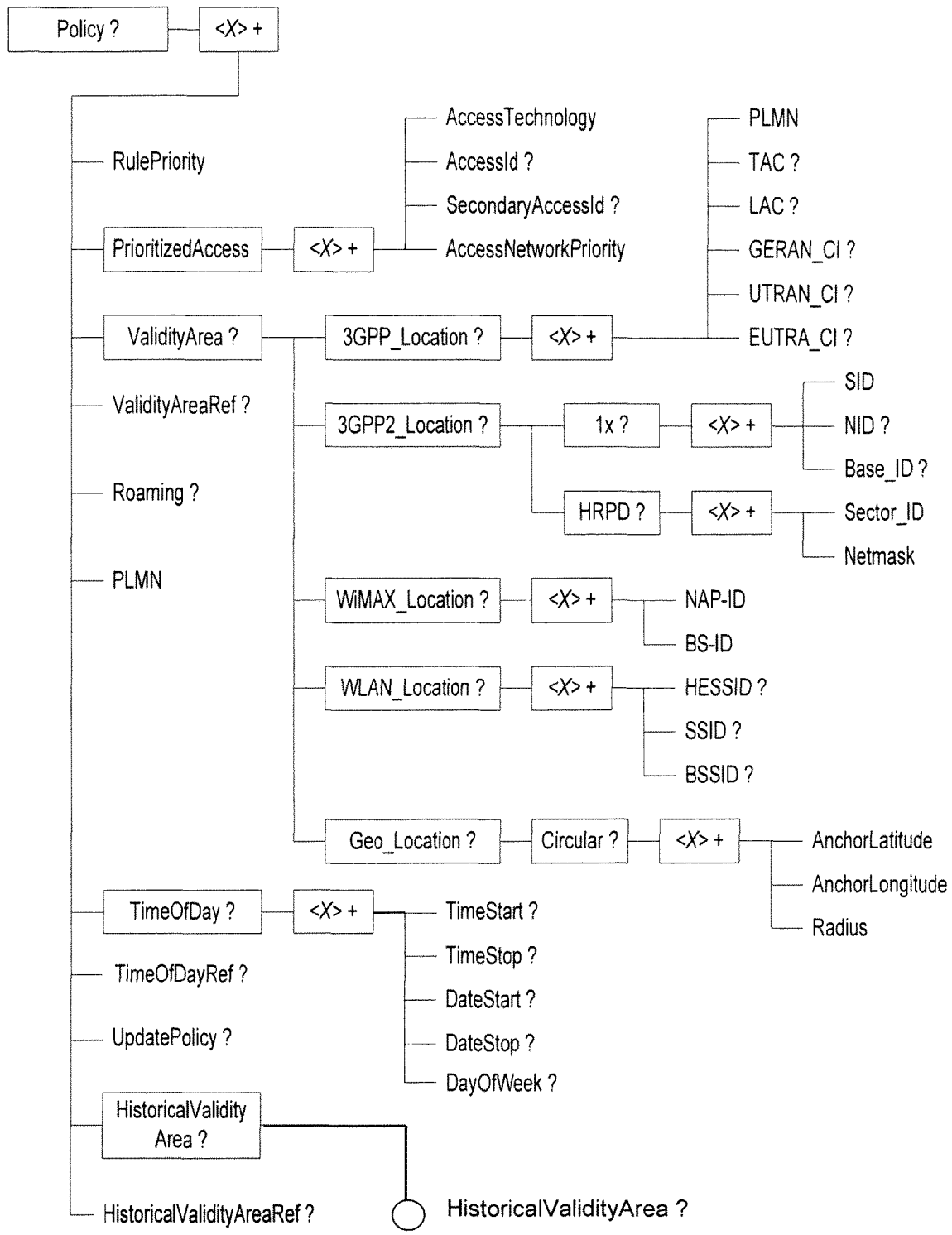
FIG.-12-

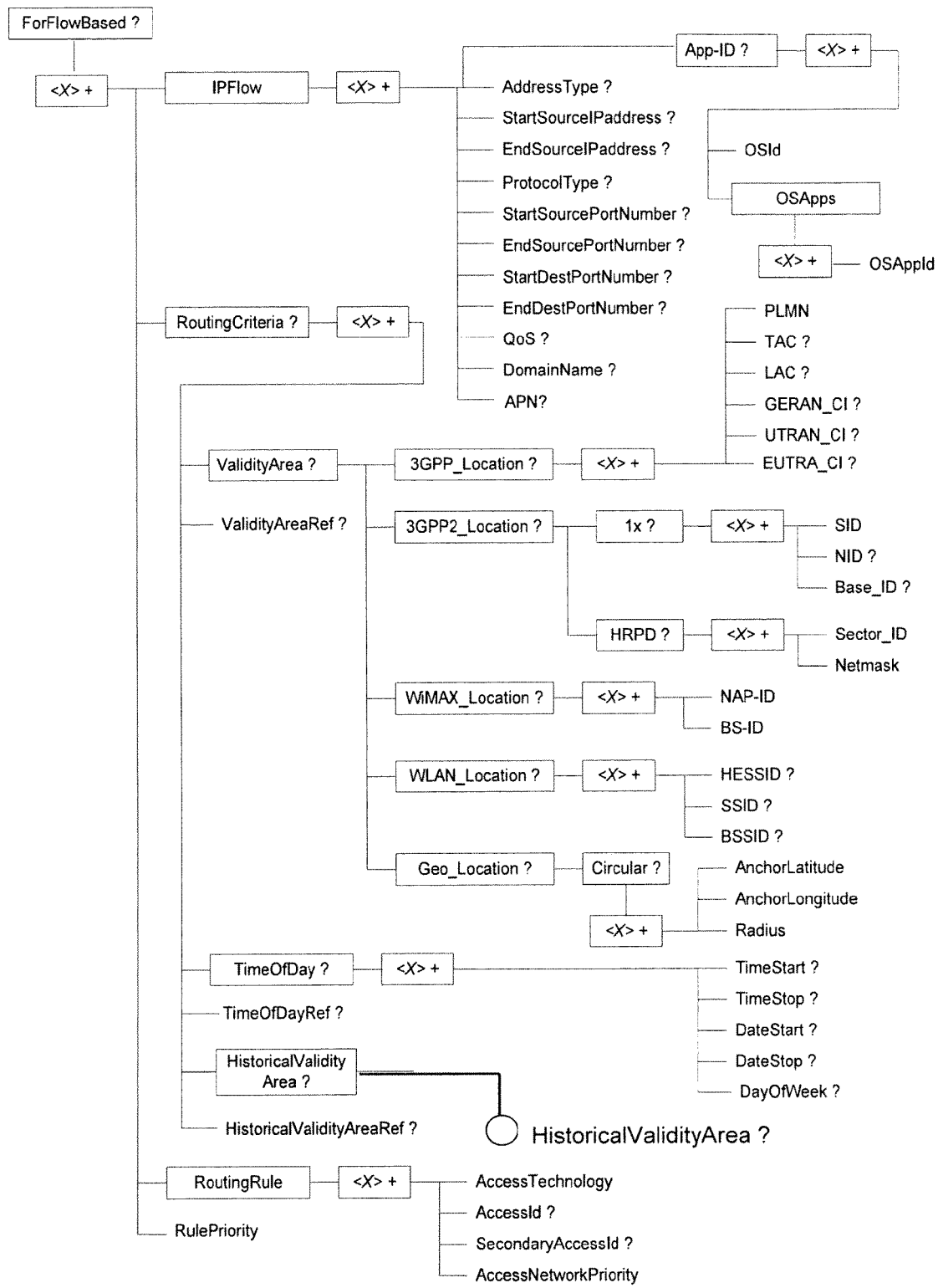
FIG.-13-

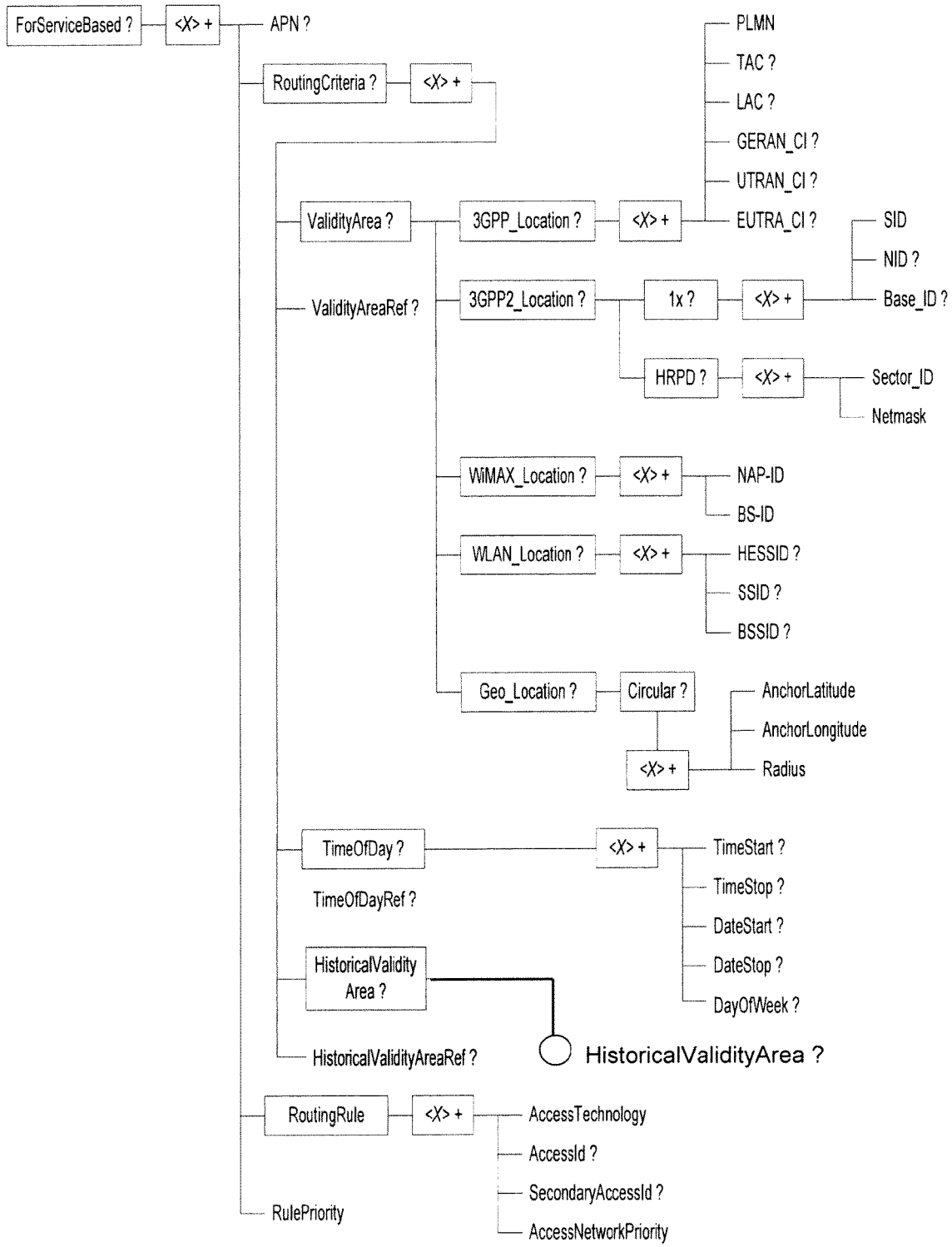
FIG.-14-

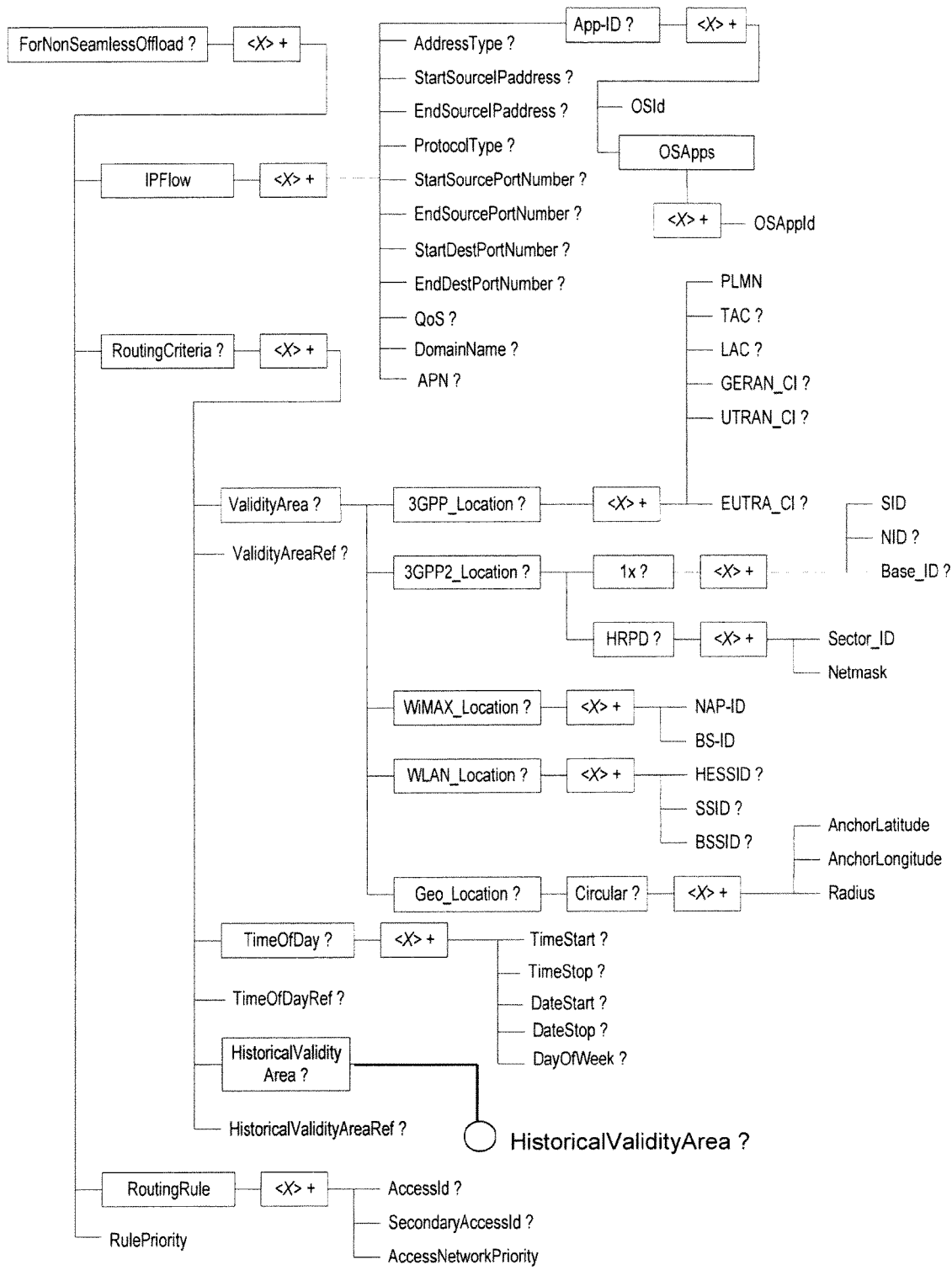
FIG.-15-

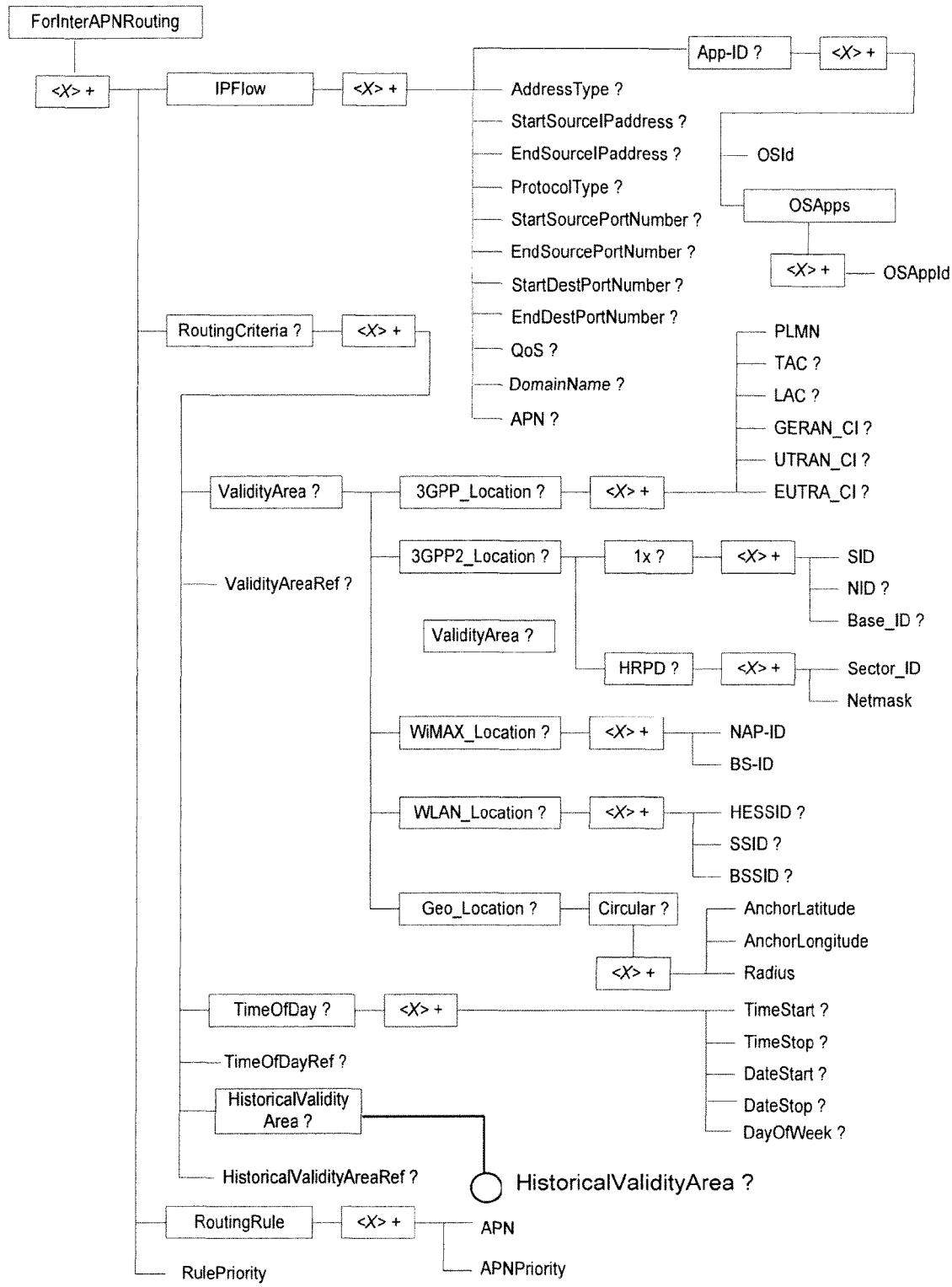
FIG.-16-

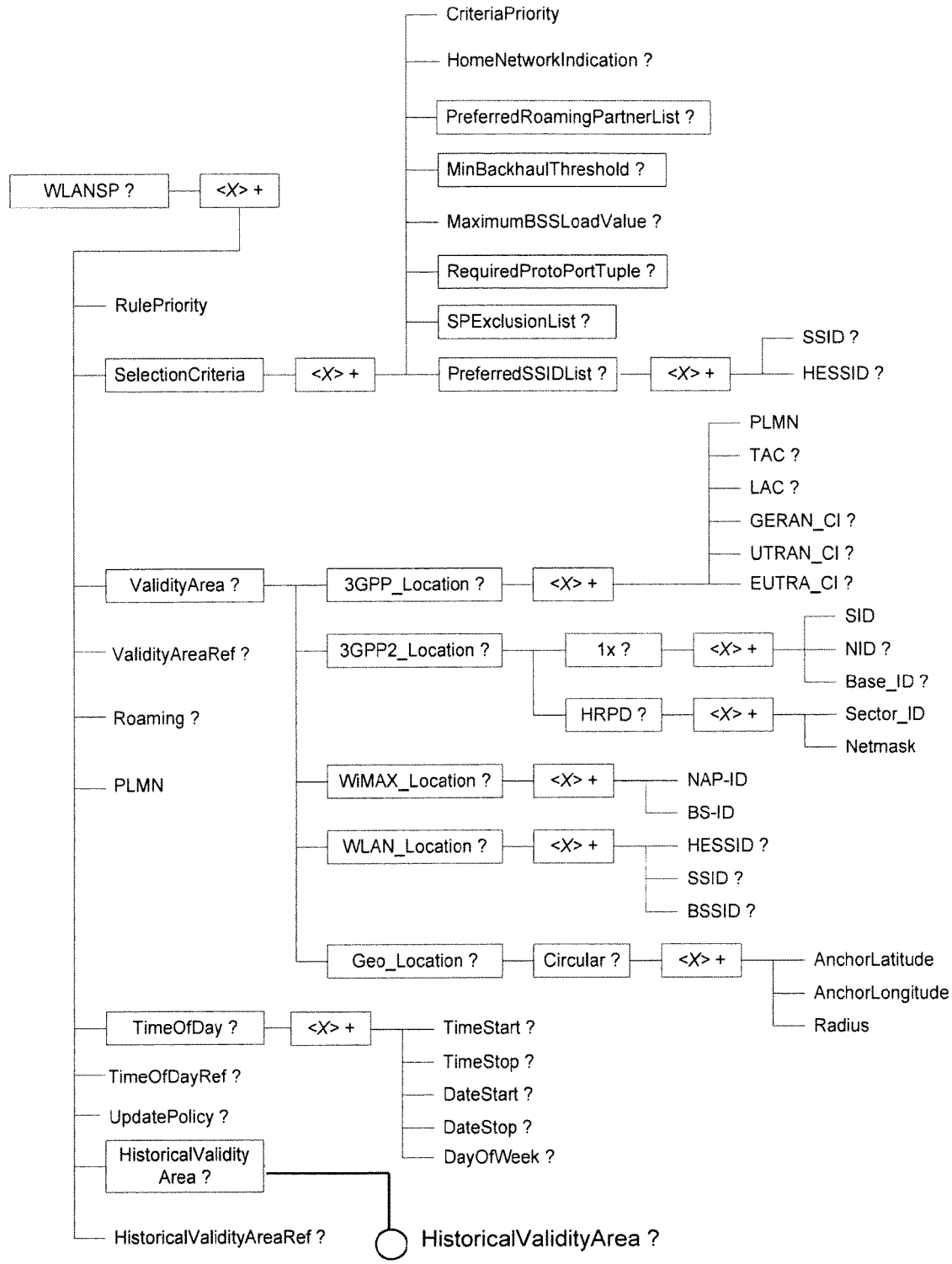
FIG.-17-

METHODS AND DEVICES FOR ACCESS NETWORK SELECTION

PRIORITY

This nonprovisional application is a U.S. National Stage Filing under 35 U.S.C. § 371 of International Patent Application Serial No. PCT/EP2014/078046 filed Dec. 16, 2014, and entitled "Methods and Devices for Access Network Selection."

TECHNICAL FIELD

The present invention generally relates to selection of an access network amongst a plurality of access networks; and, more specifically, the invention relates to methods and devices for selecting an access network amongst a plurality of access networks that selectively prevent successive handovers from a cellular network to a Wireless Land Access Network and back again to the cellular network.

BACKGROUND

An Access Network Discovery and Selection Function (ANDSF) is disclosed in 3GPP TS 23.402 V12.6.0, TS 24.302 V12.6.0 and TS 24.312 V12.6.1, and is in charge of instructing a user equipment (UE) on policies to select one access network or another. To this end, a so-called S14 reference point is defined between an ANDSF server and an ANDSF client, which resides in the UE, so that the ANDSF server can push ANDSF rules that the UE should enforce, or the UE can pull those ANDSF rules from the ANDSF server. The standardized architecture assumes that an ANDSF client runs in the UE in order to communicate with an ANDSF server, as illustrated in FIG. 1.

The ANDSF rules are sorted by priority. Each ANDSF rule indicates one more access networks, which may also be sorted by priority and which the UE should try to connect to at a given time.

Typically, a UE is provisioned with ANDSF rules indicating that the UE should have a higher priority to connect to one or more Wireless Land Access Networks, and a lower priority to connect to the cellular network. For example, as illustrated in FIG. 5, a UE with an ANDSF client may be located in an area covered by both a cellular network and a WLAN and, by applying the ANDSF rules, such UE will try first to connect to WLAN. While this type of policies works well when the UE is mostly stationary, they create some undesired side effects when the UE is moving.

For example, as illustrated in FIG. 6 and further discussed, while a train is moving, a UE located in that train is connected with a cellular network and is enabled to use both data and voice services. When the train approaches and stops in a railway station covered by a Wireless Land Access Network (WLAN), as illustrated in FIG. 7, the UE detects such WLAN, due to preloaded ANDSF rules, the UE applies such ANDSF rules prioritizing the WLAN, and connects to the WLAN.

For a UE getting off the train and staying in the area covered by the WLAN, as illustrated in FIG. 7, these ANDSF rules and the achieved behaviour are considered correct, because the UE has WLAN connectivity for a reasonably long time, and the operator indicated that the WLAN has a higher priority than the cellular network. Therefore, this is considered to be a desirable handover.

However, for a UE staying onboard the train and moving toward a next station, as also illustrated in FIG. 7, these ANDSF rules would force the UE to handover from the cellular network to WLAN, while the train is stopped, and to immediately switch back again to the cellular network, as soon as getting out of the WLAN coverage area. These two successive switches, from cellular network to WLAN and from WLAN to cellular network, creates quite a lot of signaling in the network (attach, registration, IP address acquisition), likely a change of IP address, service interruption, battery consumption etc., and for a short period of time. Therefore, this behaviour is considered to be an unnecessary handover.

In other words, in some scenarios, successive handovers between access networks, occurring in a short period of time, should be prevented.

An apparently simple solution to the problem could be to reverse the order of priorities in the ANDSF rules that are loaded to the UE, so that the WLAN has lower priority than the cellular network. However, this apparent solution has the side effect of preventing the UE from ever connecting to the WLAN, because the coverage of cellular networks is mostly ubiquitous, and the ANDSF client will maintain the UE connected to the highest priority network (cellular). So, this is actually not a feasible solution.

The international publication WO2011160682 addresses the issue of a UE approaching an area for which only coverage of a single access network exists (e.g. a tunnel). In this scenario, it is desired to switch to the only existing access network as soon as possible, even prior to the UE entering the tunnel.

WO2011160682 provides for a solution whereby the ANDSF computes a location and trajectory of the UE, so that the ANDSF can predict the tunnel entry, detect the area of single radio coverage, and push policies in advance to affected users, so that the UE can switch to the only existing access network.

Whilst both WO2011160682 and the present specification address a scenario in which the UE is moving along a trajectory that is relatively easy to predict (e.g., highways, railway tracks, etc.), both address a different problem: the trajectory followed by the UE in WO2011160682 leads to an area of single radio coverage, and the trajectory followed by the UE in the present specification leads to an area with more than one radio coverage, where there is a need to select one radio coverage for some UEs and the other one for some other UEs.

Thus, the solution disclosed in WO2011160682, where there is an area approaching with only one radio coverage, cannot be applied in the present case, i.e. when approaching an area with more than one radio coverage, to select one or another for each UE.

SUMMARY

The present invention is aimed to provide a mechanism for selecting an access network for a UE amongst a plurality of access networks, and that selectively prevents successive handovers between a first and a second access network. To this end, the present invention provides for an ANDSF server, a UE with an ANDSF client, and methods in accordance with the independent claims.

Throughout this specification, an ANDSF server is a network element, which comprises hardware and software, arranged for carrying out the functionality of an ANDSF in accordance with 3GPP standards; and an ANDSF client is a function of a UE, which may comprise hardware, software or combinations thereof, arranged for allowing the UE to communicate with an ANDSF in accordance with 3GPP standards.

In accordance with a first aspect of the present invention, there is provided a method of selecting an access network for a user equipment, UE, amongst a plurality of access networks. This method, amongst other advantages, allows selectively preventing successive handovers for a UE between a first and a second access network.

This method comprises a step of defining at an ANDSF server an ANDSF rule to be applied for selection of an access network between the first and the second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

This method also comprises a step of transmitting the ANDSF rule from the ANDSF server to an ANDSF client of the UE; and a step of tracking, at the ANDSF client, a historical trajectory for the UE by storing a list with one or more successive location areas where the UE has been located.

This method further comprises, upon matching a current location of the UE with the validity location area, and the tracked historical trajectory for the UE with the validity trajectory, a step of determining that the validity condition is fulfilled and a step of applying the ANDSF rule at the ANDSF client. Otherwise, i.e. in case of failing the matching, the method comprises a step of determining that the validity condition is not fulfilled and the ANDSF rule is not valid at the ANDSF client.

For the sake of flexibility in this method, applying the ANDSF rule may comprise either switching or not switching between the first and the second access network.

Also for flexibility purposes, the list with one or more previous location areas included in the validity trajectory may comprise any one of: a number of sequential location areas, a number of grouped location areas in any order, and combinations thereof. Moreover, the list with one or more previous location areas included in the validity trajectory may comprise optional location areas that the tracked historical trajectory for the UE may or may not include without affecting the fulfillment of the validity condition.

In order to prevent situations where switching between the first and the second access network can never occur, in an embodiment this method may further comprise a step of defining at the ANDSF server a maximum time value during which the validity condition is true for the ANDSF rule, and a step of monitoring the ANDSF rule and, upon expiry of the maximum time value, a step of determining that the validity condition is not fulfilled and the ANDSF rule is no longer valid at the ANDSF client.

In an embodiment for this method, there may be more than one ANDSF rule defined at the ANDSF server for use by the UE. Therefore, this method may further comprise a step of defining at the ANDSF server one or more further ANDSF rules to be selectively applied for selection of an access network between the first and the second access network, and wherein each further ANDSF rule comprises one or more validity conditions to fulfill for the further ANDSF rule to be applied, and a step of transmitting the one or more further ANDSF rules from the ANDSF server to the ANDSF client of the UE.

Where this is the case and further ANDSF rules are transmitted to the ANDSF client, the method may further comprise, if the validity condition of the ANDSF rule is not fulfilled, a step of determining at the ANDSF client whether other validity conditions for the ANDSF rule and for the one or more further ANDSF rules may alternatively be applied at the UE until all ANDSF rules have been checked.

In accordance with a second aspect of the present invention, there is provided an ANDSF server for selecting an access network for a UE amongst a plurality of access networks. This ANDSF server may be regarded as an entity instructing the UE on the selection of the access network amongst the plurality of access networks.

This ANDSF server comprises a rules handler configured to define an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

This ANDSF server also comprises a transmitter configured to transmit the ANDSF rule to an ANDSF client of the UE.

In an embodiment aligned with the method discussed above, the rules handler of the ANDSF server may be configured to define a maximum time value during which the validity condition is true for the ANDSF rule, and the transmitter of the ANDSF server may be configured to transmit, to the ANDSF client, the maximum time value during which the validity condition is true for the ANDSF rule.

In other embodiment aligned with the method discussed above, the rules handler of the ANDSF server may be configured to define one or more further ANDSF rules to be selectively applied for selection of an access network between the first and the second access network, wherein each further ANDSF rule comprises one or more validity conditions to fulfill for the further ANDSF rule to be applied, and the transmitter of the ANDSF server may be configured to transmit the one or more further ANDSF rules to the ANDSF client.

In accordance with a third aspect of the present invention, there is provided a UE comprising an ANDSF client for selecting an access network amongst a plurality of access networks.

This UE also comprises a receiver configured to receive, from an ANDSF server, an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

In this UE, the ANDSF client comprises a tracker configured to track a historical trajectory for the UE, by storing in a memory a list with one or more successive location areas where the UE has been located.

In this UE, the ANDSF client also comprises a rules handler configured to: upon matching a current location of the UE with the validity location area, and the tracked historical trajectory for the UE with the validity trajectory, determine that the validity condition is fulfilled and apply the ANDSF rule; and, otherwise, determine that the validity condition is not fulfilled and the ANDSF rule is not valid.

As commented above for the method, in applying the ANDSF rule, the rules handler of the ANDSF client may be configured to trigger either switching or not switching between the first and the second access network, in accordance with the ANDSF rule.

In an embodiment aligned with the method discussed above, the receiver of the UE may be configured to receive, from the ANDSF server, a maximum time value during which the validity condition is true for the ANDSF rule, and the rules handler of the ANDSF client may be configured to monitor the ANDSF rule and, upon expiry of the maximum time value, determine that the validity condition is not fulfilled and the ANDSF rule is no longer valid.

In other embodiment aligned with the method discussed above, the receiver of the UE may be configured to receive, from the ANDSF server, one or more further ANDSF rules to be selectively applied for selection of an access network between the first and the second access network, and wherein each further ANDSF rule comprises one or more validity conditions to fulfill for the ANDSF rule to be applied. Under this embodiment, the rules handler of the ANDSF client may be further configured, if the validity condition of the ANDSF rule is not fulfilled, to determine whether other validity conditions for the ANDSF rule and for the one or more further ANDSF rules may alternatively be applied to the UE until all ANDSF rules have been checked.

In accordance with a fourth aspect of the present invention, there is provided a method of selecting an access network for a UE amongst a plurality of access networks, the method carried out at an ANDSF server. This method may be regarded as a method for instructing the UE on the selection of the access network amongst the plurality of access networks.

This method comprises a step of defining an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

This method also comprises a step of transmitting the ANDSF rule to an ANDSF client of the UE.

In an embodiment aligned with the first method discussed above, this method may comprise a step of defining a maximum time value during which the validity condition is true for the ANDSF rule, and a step of transmitting, to the ANDSF client, the maximum time value during which the validity condition is true for the ANDSF rule.

In other embodiment aligned with the first method discussed above, this method may comprise a step defining one or more further ANDSF rules to be selectively applied for selection of an access network between the first and the second access network, wherein each further ANDSF rule comprises one or more validity conditions to fulfill for the further ANDSF rule to be applied, and a step of transmitting the one or more further ANDSF rules to the ANDSF client.

In accordance with a fifth aspect of the present invention, there is provided a method of selecting an access network for a UE, amongst a plurality of access networks, the method carried out at an ANDSF client.

This method comprises a step of receiving, from an ANDSF server, an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

This method also comprises a step of tracking a historical trajectory for the UE by storing a list with one or more successive location areas where the UE has been located.

In this method, upon matching a current location of the UE with the validity location area, and the tracked historical trajectory for the UE with the validity trajectory, there is a step of determining that the validity condition is fulfilled and a step of applying the ANDSF rule, and otherwise, i.e. upon failure of a matching, there is a step of determining that the validity condition is not fulfilled and the ANDSF rule is not valid.

In an embodiment aligned with the first method discussed above, applying the ANDSF rule may comprise either switching or not switching between the first and the second access network.

In other embodiment aligned with the first method discussed above, this method may comprise a step of receiving, from the ANDSF server, a maximum time value during which the validity condition is true for the ANDSF rule, a step of monitoring the ANDSF rule and, upon expiry of the maximum time value, a step of determining that the validity condition is not fulfilled and the ANDSF rule is no longer valid.

In a further embodiment aligned with the first method discussed above, this method may comprise a step of receiving, from the ANDSF server, one or more further ANDSF rules to be selectively applied for selection of an access network between the first and the second access network, and wherein each further ANDSF rule comprises one or more validity conditions to fulfill for the ANDSF rule to be applied. Under this embodiment, the method may further comprise, if the validity condition of the ANDSF rule is not fulfilled, a step of determining whether other validity conditions for the ANDSF rule and for the one or more further ANDSF rules may alternatively be applied to the UE until all ANDSF rules have been checked.

The ANDSF server, the ANDSF client and the methods discussed above, they all contribute to solve the problem of selecting an access network for a UE amongst a plurality of access networks, and the problem of selectively preventing successive handovers for a UE between a first and a second access network, whilst most of the computational load is distributed to each potentially affected UE, instead of significantly increasing the computational load on the ANDSF server, so that the overall mechanism does not introduce scalability problems for the ANDSF server.

Whilst the solution disclosed in WO2011160682 requires tracking the location of each UE and predicting its trajectory at the ANDSF server, the solution provided in accordance with the present invention provides for the ANDSF client tracking the historical trajectory for the UE and determining applicability of the ANDSF rule received from the ANDSF server. The ANDSF server provided in accordance with this invention is not overloaded with the computational load derived from tracking the location and predicting the trajectory for a huge number of UEs, as the ANDSF of WO2011160682 does. As a consequence, the ANDSF server provided in accordance with this invention, which does not significantly increase the computational load on the ANDSF server, can more easily be scaled than the one in WO2011160682.

BRIEF DESCRIPTION OF THE DRAWINGS

The features, objects and advantages of the invention will become apparent by reading this description in conjunction with the accompanying drawings, in which:

FIG. 1 shows a basic block diagram of a UE comprising an ANDSF client in communication with an ANDSF server.

FIG. 2 shows a basic component structure of an ANDSF client.

FIG. 3 shows a basic component structure of an ANDSF server.

FIG. 4 illustrates an exemplary sequence of actions carried out by an ANDSF server and an ANDSF client for selecting an access network for a UE amongst a plurality of access networks, and applicable for selectively preventing handovers for a UE between a first and a second access network.

FIG. 5 illustrates a scenario where a UE is located in an area with coverage by a first and a second access networks to access an Evolved Packet Core (EPC) network.

FIG. 6 illustrates an exemplary scenario where a first and a second UE follow a trajectory only covered by a cellular access network and are approaching an area with coverage by the same cellular access network and by a WLAN.

FIG. 7 illustrates an exemplary scenario where a first and a second UE, which had been following a same trajectory covered by a cellular access network, are currently located in an area with coverage by the cellular access network and by a WLAN, and where the first and the second UE separate from each other to follow a different trajectory.

FIG. 8 shows an exemplary table with cell values for a number of cells, and usable to represent and handle an exemplary Historical Validity Area.

FIG. 9 represents a Validity Criteria container, in accordance with a corresponding ANDSF Management Object specified in 3GPP TS 24.312 (2014-10), and amended to include a Historical Validity Area extension in accordance with an embodiment of the invention.

FIG. 10 represents contents of an exemplary Historical Validity Area container in accordance with an embodiment of the invention, and which may be used to extend ANDSF Management Objects specified in 3GPP TS 24.312 (2014-10).

FIG. 11 represents further contents of an exemplary Historical Validity Area container in accordance with an embodiment of the invention, and which may be used to extend ANDSF Management Objects specified in 3GPP TS 24.312 (2014-10).

FIG. 12 represents a Policy container, in accordance with a corresponding ANDSF Management Object specified in 3GPP TS 24.312 (2014-10), and amended to also include a Historical Validity Area extension in accordance with an embodiment of the invention.

FIG. 13 represents a ForFlowBased container, in accordance with a corresponding ANDSF Management Object specified in 3GPP TS 24.312 (2014-10), and amended to also include a Historical Validity Area extension in accordance with an embodiment of the invention.

FIG. 14 represents a ForServiceBased container, in accordance with a corresponding ANDSF Management Object specified in 3GPP TS 24.312 (2014-10), and amended to also include a Historical Validity Area extension in accordance with an embodiment of the invention.

FIG. 15 represents a ForNonSeamlessOffload container, in accordance with a corresponding ANDSF Management Object specified in 3GPP TS 24.312 (2014-10), and amended to also include a Historical Validity Area extension in accordance with an embodiment of the invention.

FIG. 16 represents a ForinterAPNRouting container, in accordance with a corresponding ANDSF Management Object specified in 3GPP TS 24.312 (2014-10), and amended to also include a Historical Validity Area extension in accordance with an embodiment of the invention.

FIG. 17 represents a WLANSP container, in accordance with a corresponding ANDSF Management Object specified in 3GPP TS 24.312 (2014-10), and amended to also include a Historical Validity Area extension in accordance with an embodiment of the invention.

DETAILED DESCRIPTION

The following describes currently preferred embodiments of a method of selecting an access network for a UE amongst a plurality of access networks, an enhanced ANDSF server and an enhanced ANDSF client, both configured to carry out said method. In particular, this method is applicable for selectively preventing handovers for a UE between a first and a second access network. The following also describes respective methods for the ANDSF server instructing the UE on selection of an access network amongst a plurality of access networks, and for the ANDSF client selecting an access network for a UE amongst a plurality of access networks.

Since this method of selecting an access network for a UE amongst a plurality of access networks is applicable for selectively preventing handovers for a UE between a first and a second access network, the embodiments and descriptions discussed hereinafter may indistinctly refer to the method of selecting an access network for a UE amongst a plurality of access networks or to the method for selectively preventing handovers for a UE between a first and a second access network.

FIG. 1 illustrates an ANDSF server 1 communicating with an ANDSF client 21 located in a UE 2 via the so-called S14 interface. The standard S14 interface allows for transmission of ANDSF rules. The ANDSF rules become valid when certain validity conditions are fulfilled. Standard validity conditions include the definition of a validity location area where the ANDSF rule is valid, the definition of a period of time where the ANDSF rule is valid, or a roaming condition. Validity location areas are areas where the UE is located at certain times. These validity location areas can be defined in terms of 3GPP cellular areas (cell-id, location area code, tracking area code, PLMN code, etc.), 3GPP2 cellular areas, WLAN areas (coverage of an SSID), WiMAX areas, or geographical areas (a circle determined by its geographical center and a radius).

The ANDSF rules are usable in scenarios like the one illustrated in FIG. 5. In this scenario, a UE 2 is located in an area wherein there is coverage by a first access network 10 and by a second access network 20 to access an EPC network 30. Particularly in this FIG. 5, the first access network 10 may be a cellular access network with a cell tower near the UE 2, and the second access network 20 may be WLAN with a WLAN Access Point (AP) near the UE 2. In order to facilitate the election by the UE of the access network to connect through, as well as in order to accomplish operator policies of the EPC network, an ANDSF server 1 in the EPC network is enabled to send ANDSF rules to an ANDSF client residing in the UE 2, and these ANDSF rules make the UE 2 select one or another access network, amongst the accessible first access network 10 and second access network 20.

The currently existing ANDSF rules and interface S14 do not always allow making a right selection and, especially for users in movement and following certain trajectories, the ANDSF rules which are very appropriate for some users are not always appropriate for other users.

The solution provided for throughout the present specification extends the S14 interface. More precisely, the extension to S14 extends the contents of validity conditions for ANDSF rules to be valid with a new condition. This new condition is better explained with reference to the scenarios illustrated in FIG. 6 and FIG. 7 and corresponding discussions in the following.

FIG. 6 illustrates a scenario where a first UE 2a and a second UE 2b are located in a train that is approaching a railway station. As the train moves over the railway tracks, both UEs are using the cellular coverage offered by the various cells that cover the network (cells C1 10a and C2 10b). When the train approaches the railway station, the UE is using cell C3 10c. At a certain point in time, the UEs detect the availability of a highly prioritized WLAN W1 20, and the ANDSF client running in each UE executes a regular ANDSF rule that mandates the UE to connect to the WLAN W1 covering the railway station.

In particular, FIG. 6 illustrates two circles labelled "WLAN W1" that represent the coverage of two WLAN Access Points that are broadcasting a same SSID, "W1" in the example, and they thus belong to the same WLAN.

A short period of time later, and not illustrated in this drawing, the train would resume its movement towards the next station, making the UEs move to an area where the UEs are no longer under WLAN W1 coverage. Therefore, the UEs would move back to the cellular network, namely through cells C4 10d and C5 10e.

Given that both UEs have been all the time on board the train, switching from the original cellular network to the WLAN network, when the train stops in the railway station, and switching back to the original cellular network, when the train resumes its movement, is an undesirable handover aiming the present solution.

FIG. 7 illustrates a more complex, and more realistic, scenario than the one illustrated in FIG. 6, and which may be considered a continuation of the situation illustrated in FIG. 6.

In the scenario illustrated in FIG. 7, the first UE 2a and the second UE 2b, which were located in the train when approaching the railway station, follow a different behaviour when the train stops in the railway station. Whilst the first UE 2a gets off the train at the railway station and continues walking through the station and other buildings, the second UE 2b continues in the train and will go towards a next station.

It is desirable that appropriate ANDSF rules were provided that make the first UE 2a switch from the original cellular network (cells C3 10c or C4 10d) to the WLAN W1 20 and that make the second UE 2b continue in the original cellular network (cells C3 10c or C4 10d).

To this end, and as previously commented, the solution provided for in this specification extends the validity conditions for ANDSF rules to be valid with a new condition. Whilst a standard validity condition may include the definition of a validity location area that, where the UE is located in said validity location area, the ANDSF rule is valid, this new condition introduces the idea of the UE having followed a certain trajectory, and not another, towards the validity location area, for making the ANDSF rule be valid.

That is, in the exemplary scenarios illustrated in FIG. 6 and FIG. 7, both first and second UEs receive the same ANDSF rules from the ANDSF server, and by applying these same ANDSF rules, the first UE 2a switches from the original cellular network to the WLAN W1 whereas the second UE 2b continues in the original cellular network. To this end, the new condition includes a validity trajectory that comprises a list with one or more previous location areas, where the UE has been located prior to arriving at the validity location area. For instance, a UE like the second UE 2b, which has followed a trajectory consisting of cell C1, then C2, then C3 and, optionally, then C4, as illustrated in FIG. 7, should continue in the cellular network and should not switch to WLAN; however, a UE like the first UE 2a, which has followed a trajectory consisting of cell C1, then C2, then C3 and then e.g. C7 10g should switch from the cellular network to WLAN.

Likewise and by applying the same ANDSF rules, a UE not illustrated in these drawings, which had followed a trajectory consisting of cell C5, then C4 and then, optionally, C3 (that is, the opposite way as the one illustrated in FIG. 6 and FIG. 7) would continue in the cellular network and would not switch to WLAN.

An exemplary set of two ANDSF rules is discussed in the following to solve the exemplary scenario discussed above with reference to FIG. 6 and FIG. 7, so that, by applying these two ANDSF rules both first UE 2a and second UE 2b behave in a different manner.

A first ANDSF rule with the highest priority is defined as:
Select WLAN W1 if Condition #1 and Condition #2 are valid. That is, the validity condition may be expressed as: Condition #1 AND Condition #2.
Condition #1: Historical cell trajectory: Not have being located in (Sequence: Cell C1, then Cell C2, then Cell C3 and then, optionally, Cell C4).
Condition #2: Historical cell trajectory: Not have being located in (Sequence: Cell C5, then Cell C4 and then, optionally Cell C3).

A second ANDSF rule with lower priority is defined as:
Select cellular network.

The first ANDSF rule provisions the UE to select WLAN W1 except when the UE is approaching the station from the South (C1, C2, C3) or from the North (C5, C4, C3), and to this end the first ANDSF rule includes one condition for each direction of movement along the railway tracks. The validity condition of this first ANDSF rule thus includes Condition #1 and Condition #2. For the first ANDSF rule to be valid, both conditions must evaluate to true. Since both conditions are negated, if the UE has been moving along one of the trajectories described in these conditions, that condition will evaluate to false and will make the first ANDSF rule not valid, which is the desired result. If the UE has not been located along any of the trajectories described in both conditions, since the conditions are negated, both conditions evaluate to true, and so it evaluates the first ANDSF rule, making the UE connect to WLAN W1.

The second ANDSF rule provisions the UE to select the cellular network in all other occasions. The validity condition of this second ANDSF rule thus includes any conditions that make the first ANDSF rule be invalid.

According to these first and second ANDSF rules, a UE will try to connect to WLAN W1 if it has not been located in the areas of coverage of Cell C1, Cell C2, Cell C3 and, optionally, Cell C4 (in order) and if it has not located in the areas of coverage of Cell C5, Cell C4 and, optionally, Cell C3 (in order). Otherwise, it will use the cellular network. For example, a UE walking through cells C6 10f and C7 10g would connect to WLAN W1 as soon as such UE enters the coverage area of WLAN W1 20.

Back to the movement scenario illustrated by FIG. 6 and then FIG. 7, the applicability of these first and second ANDSF rules is further explained in more detail.

The second UE 2b has been passing through the locations of Cell C1 and Cell C2, where there was not coverage of WLAN W1, so it could not connect to WLAN, as shown in FIG. 6. Then, the second UE 2b enters the coverage area of Cell C3 (after C1 and C2 in order) and, when the train calls at the station, the second UE 2b 2 remains onboard the train as shown in FIG. 7. At this point in time, the second UE 2b is currently located under the coverage of Cell C3 10c (or, optionally, it reaches the coverage of Cell C4 10d after having passed through Cell C3) and also under the coverage of WLAN W1 20. The second UE 2b then evaluates the first ANDSF rule and determines that condition #1 is not valid, because the second UE 2b has been previously connected to Cell C1, Cell C2, and is currently connected to Cell C3. Therefore, since the condition is negated, the condition #1 evaluates to invalid, making the first ANDSF rule invalid as well. So, the second UE 2b analyzes the second ANDSF rule, which selects the cellular network in any other condition. Since the second UE 2b is already attached to cellular, it will continue attached to it.

When the train resumes its movement, the second UE 2b will be located under the area of coverage of Cell C4, while at the same time still receiving WLAN W1. The second UE 2b will evaluate the ANDSF rules and determine that condition #1 still evaluates to false, making the first ANDSF rule invalid, and discarding that rule in favor of the second ANDSF rule. As a consequence the second UE 2b will remain attached to the cellular network, which is the desired effect of ignoring WLAN W1.

On the other hand, the first UE 2a has gotten off the train at the railway station. The first UE 2a has been located under the coverage area of Cell C1, Cell C2, and it is currently under the coverage of Cell C3 when the first UE 2a gets off. As for the second UE 2b, the first UE 2a evaluates the ANDSF rules and, starting with the first ANDSF rule, the first UE 2a determines that the condition #1 evaluates to false, making the first ANDSF rule invalid, and discarding that rule in favor of the second ANDSF rule. As a consequence, the first UE 2a remains attached to the cellular network when getting off the train. Then, while moving through the railway station building, the first UE 2a will eventually be located in the area of coverage of Cell C6 10f or Cell C7 10g. At this point in time, the first UE 2a evaluates the ANDSF rules and determines that condition #1 now evaluates to true, making the first ANDSF rule valid. As a consequence, the first UE 2a attaches to WLAN W1 20 and will continue using this access network as long as it is under this WLAN coverage.

As discussed above, this new condition for ANDSF rules is based on a historical trajectory of coverage areas of cells where the UE has been located to in the past. A new validity condition, which includes the new condition, can be part of any regular ANDSF rule. If this new condition is combined with other existing conditions, such as the existing time conditions, to form the new validity condition, then it is possible to create more complex ANDSF rules that are applicable to certain periods of time. For example, it is possible to restrict the exemplary first ANDSF rule mentioned above to be applicable only during the rush hour in the morning (Monday to Friday from 7 to 9).

The solution described throughout this specification makes it use of signaling flows of the S14 interface and provides for the UEs being constantly re-evaluating validity conditions, including the new condition, to find out whether a higher priority ANDSF rule should be enforced instead of the current one.

This solution may be better described with reference to FIG. 4. The FIG. 4 illustrates, on the one hand, a first method of selecting an access network for a UE amongst a plurality of access networks, also referred to as a method for selectively preventing handovers for a UE between a first and a second access network, carried out by an ANDSF server and an ANDSF client; and, on the other hand, a second method for the ANDSF server instructing the UE on selection of an access network amongst a plurality of access networks, and a third method for the ANDSF client selecting an access network for a UE amongst a plurality of access networks.

In these first and second methods illustrated in FIG. 4, there is a step S-410 of defining at an ANDSF server 1 an ANDSF rule to be applied for selection of an access network between the first and the second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

Also in these first and second methods illustrated in FIG. 4, there is a step S-420 transmitting the ANDSF rule from the ANDSF server 1 to an ANDSF client 21 of a UE 2. This transmission is carried out with a massage named ANDSF rule provision in the instant specification, but any other existing message between the ANDSF server and the ANDSF client may be used as well.

For the sake of simplicity, citations of the UE are generally made to UE 2; however, these citations are also applicable to UE 2a and UE 2b, unless otherwise indicated.

Implicitly illustrated in this FIG. 4, there is a step S-420 (in the third method for the ANDSF client) of receiving, from an ANDSF server 1, an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

In these first and third methods illustrated in FIG. 4, there is a step S-430 of tracking, at the ANDSF client 21, a historical trajectory for the UE by storing a list with one or more successive location areas where the UE has been located. As part of this step, the ANDSF client may determine at any change of location, a current location of the UE 2.

Also in these first and third methods illustrated in FIG. 4, there is a step S-440 of checking whether a current location of the UE matches the validity location area, and a step S-450 of checking whether the tracked historical trajectory for the UE matches the validity trajectory.

Upon matching the current location of the UE with the validity location area, and the tracked historical trajectory for the UE with the validity trajectory, in these first and third methods there is a step S-460 of determining that the validity condition is fulfilled and applying the ANDSF rule at the ANDSF client 21.

In order to offer more flexibility to the definition of ANDSF rules, applying the ANDSF rule may comprise either switching or not switching between the first and the second access network. That is, an ANDSF rule may be defined so that upon fulfillment of the validity condition, the ANDSF rule may instruct either switching or not switching between the first and the second access network.

Otherwise, i.e. at least one matching fails, in these first and third methods there is a step S-470 of determining that the validity condition is not fulfilled and the ANDSF rule is not valid at the ANDSF client 21.

Participating in the above first method and carrying out the above second method there is provided an ANDSF server 1, as schematically illustrated in FIG. 3.

As shown in FIG. 3, the ANDSF server 1 comprises a rules handler 155 configured to define an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

The ANDSF server 1 shown in FIG. 3 also comprises a transmitter 170 configured to transmit the ANDSF rule to the ANDSF client 21 of the UE 2. Both rules handler 155 and transmitter 170 are in communication with each other and with other elements or units of the ANDSF server 1.

The ANDSF server 1 shown in FIG. 3 may also comprise at least one processor 150 and at least one memory 160, both in communication with each other, with the rules handler 155 and the transmitter 170, and with other elements or units of the ANDSF server 1. The at least one memory 160 may comprise volatile and/or non-volatile memory. In particular, the at least one memory 160 may have a computer program 162 and data 166 stored therein. The computer program 162 may be loaded in the at least one memory 160 from a computer program product 190, such as any non-transitory computer readable medium, in which the computer program is stored. The data 166 may comprise one or more ANDSF rules defined at the ANDSF server 1. The at least one processor 150 may be configured to carry out the functions of the rules handler 155.

Especially advantageous for a case where the ANDSF rules are provided upon request from the ANDSF client 21, the ANDSF server 1 shown in FIG. 3 may also comprise a receiver 180 configured to receive, from the ANDSF client 21, a request for ANDSF rules. This receiver 180 may be also in communication with the at least one processor 150, the at least one memory 160, the rules handler 155 and the transmitter 170, as well as with other elements or units of the ANDSF server 1.

In the case that the ANDSF rules are provided upon request from the ANDSF client 21, the first and second methods commented above with reference to FIG. 4 may include a step, not illustrated in any drawing, of receiving at the ANDSF server 1 from the ANDSF client 21 a request for ANDSF rules.

Participating in the above first method and carrying out the above third method there is provided an ANDSF client 21 of a UE 2, which is schematically illustrated in FIG. 2.

As shown in FIG. 2, the UE 2 comprises an ANDSF client 21 for selecting an access network amongst a plurality of access networks, and a receiver 230 configured to receive, from an ANDSF server 1, an ANDSF rule to be applied for selection of an access network between a first 10 and a second 20 access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas.

This ANDSF client 21 comprises a tracker 222 configured to track a historical trajectory for the UE, by storing in a memory 210 a list with one or more successive location areas where the UE has been located. In particular, the tracker 222 may be configured to determine at any change of location, a current location of the UE.

This ANDSF client 21 also comprises a rules handler 226 configured to, upon matching a current location of the UE with the validity location area, and the tracked historical trajectory for the UE with the validity trajectory, determine that the validity condition is fulfilled and apply the ANDSF rule. Otherwise, i.e. where a matching fails, the rules handler 226 is configured to determine that the validity condition is not fulfilled and the ANDSF rule is not valid.

The UE 2 shown in FIG. 2 may also comprise at least one processor 220 and at least one memory 210, both in communication with each other, with the receiver 230, with the tracker 222 and rules handler 226 of the ANDSF client 21, and with other elements or units of the UE 2. The at least one memory 210 may comprise volatile and/or non-volatile memory. In particular, the at least one memory 210 may have a computer program 214 and data 218 stored therein. The computer program 214 may be loaded in the at least one memory 210 from a computer program product 250, such as any non-transitory computer readable medium, in which the computer program is stored. The data 218 may comprise one or more ANDSF rules received from the ANDSF server 1. The at least one processor 220 may be configured to run the functions of the ANDSF client 21 and thus also the functions of the tracker 222 and the rules handler 226.

Especially advantageous for a case where the ANDSF rules are provided upon request from the ANDSF client 21, the UE 2 shown in FIG. 2 may also comprise a transmitter 240 configured to transmit, from the ANDSF client 21 to the ANDSF server 1, a request for ANDSF rules. This transmitter 240 may be also in communication with the at least one processor 220, the at least one memory 210, the receiver 230, the ANDSF client 21, and thus also with the tracker 222 and rules handler 226 of the ANDSF client 21, as well as with other elements or units of the UE 2.

In the case that the ANDSF rules are provided upon request from the ANDSF client 21, the first and third methods commented above with reference to FIG. 4 may include a step, not illustrated in any drawing, of transmitting a request for ANDSF rules from the ANDSF client 21 to the ANDSF server 1.

For the sake of simplicity, the validity trajectory and the list with one or more previous location areas that the validity trajectory comprises, i.e. location areas where the UE has been located prior to arriving at a current location area, may further be referred to as Historical Validity Area or, indistinctly, as the list of previous location areas. In an embodiment of the invention, the Historical Validity Area may also include a current location area where the user is currently located. In another embodiment of the invention the current location area may be separate and not included in the Historical Validity Area.

In other words, the term Historical Validity Area may be used to specify a list with one or more previous location areas where the UE should have been located (or not) in order to make the ANDSF rule be valid. This list of previous location areas included in the validity trajectory can indicate a number of sequential location areas, a number of grouped location areas in any order, and combinations thereof. Moreover, this list of previous location areas included in the validity trajectory can comprise optional location areas that the tracked historical trajectory for the UE may or may not include without affecting the fulfillment of the validity condition.

Still with reference to the methods illustrated in FIG. 4 and commented above, there are further advantageous embodiments commented in the following. These methods correspond to: a first method of selecting an access network for a UE amongst a plurality of access networks, also referred to as a method for selectively preventing handovers for a UE between a first and a second access network, carried out by an ANDSF server and an ANDSF client; a second method for the ANDSF server instructing the UE on selection of an access network amongst a plurality of access networks, and a third method for the ANDSF client selecting an access network for a UE amongst a plurality of access networks.

In an embodiment applicable to the first and the second method, not illustrated in any drawing, there may be a step of defining at the ANDSF server a maximum time value during which the validity condition is true for the ANDSF rule, and there may be a step of transmitting, from the ANDSF server to the ANDSF client, the maximum time value during which the validity condition is true for the ANDSF rule.

In a corresponding embodiment applicable to the first and the third method, not illustrated in any drawing, there may be a step of receiving, at the ANDSF client from the ANDSF server, a maximum time value during which the validity condition is true for the ANDSF rule, and there may be a step of monitoring the ANDSF rule at the ANDSF client and, upon expiry of the maximum time value, determining that the validity condition is not fulfilled and the ANDSF rule is no longer valid.

In another embodiment applicable to the first and the second method, not illustrated in any drawing, there may be a step of defining at the ANDSF server one or more further ANDSF rules to be selectively applied for selection of an access network between the first and the second access network, and wherein each further ANDSF rule comprises one or more validity conditions to fulfill for the further ANDSF rule to be applied, and there may be a step of transmitting the one or more further ANDSF rules from the ANDSF server to the ANDSF client of the UE.

In a corresponding embodiment applicable to the first and the third method, not illustrated in any drawing, there may be a step of receiving, at the ANDSF client from the ANDSF server, the one or more further ANDSF rules to be selectively applied for selection of an access network between the first and the second access network, and wherein each further ANDSF rule comprises one or more validity conditions to fulfill for the ANDSF rule to be applied. Under this embodiment and subsequently to receiving the one or more further ANDSF rules, if the validity condition of the ANDSF rule is not fulfilled, there may be a step of determining whether other validity conditions for the ANDSF rule and for the one or more further ANDSF rules may alternatively be applied to the UE until all ANDSF rules have been checked.

In order to carry out these advantageous embodiments for the first, second and third methods above, there are provided corresponding advantageous embodiments for ANDSF server 1 and the ANDSF client 21.

In an embodiment for the ANDSF server, the rules handler 155 may be configured to define a maximum time value during which the validity condition is true for the ANDSF rule, and the transmitter 170 may be configured to transmit, to the ANDSF client, the maximum time value during which the validity condition is true for the ANDSF rule.

In a corresponding embodiment for the ANDSF client, the receiver 230 may be configured to receive, from the ANDSF server, a maximum time value during which the validity condition is true for the ANDSF rule, and the rules handler 226 may be configured to monitor the ANDSF rule and, upon expiry of the maximum time value, determine that the validity condition is not fulfilled and the ANDSF rule is no longer valid.

In another embodiment for the ANDSF server, the rules handler 155 may be configured to define one or more further ANDSF rules to be selectively applied for selection of an access network between the first and the second access network, wherein each further ANDSF rule comprises one or more validity conditions to fulfill for the further ANDSF rule to be applied, and the transmitter 170 may be configured to transmit the one or more further ANDSF rules to the ANDSF client.

In a corresponding embodiment for the ANDSF client, the receiver 230 may be configured to receive, from the ANDSF server, the one or more further ANDSF rules to be selectively applied for selection of an access network between the first and the second access network, and wherein each further ANDSF rule comprises one or more validity conditions to fulfill for the ANDSF rule to be applied. Under this embodiment and subsequently to receiving the one or more further ANDSF rules, the rules handler 226 may further be configured, if the validity condition of the ANDSF rule is not fulfilled, to determine whether other validity conditions for the ANDSF rule and for the one or more further ANDSF rules may alternatively be applied to the UE until all ANDSF rules have been checked.

After having discussed above different embodiments for the methods and for the ANDSF server and ANDSF client provided for in the present specification, it is worthwhile to go deeper in explaining particular details and embodiments of this solution.

For instance, the result of evaluating a Historical Validity Area expression may be boolean: either the condition is valid (TRUE) or invalid (FALSE). In case the Historical Validity Area expression results in valid (TRUE), the ANDSF rule that is conditionally dependent on the condition is candidate to be valid. The ANDSF rule may be finally valid or invalid depending on the result of additional existing conditions (for example, time conditions). All the conditions in an ANDSF rule (but those defined optional) must be valid in order to make the ANDSF rule be valid. However, if the Historical Validity Area expression results in invalid (FALSE), the ANDSF rule that is conditionally dependent on the condition is automatically deemed as invalid.

Therefore, a special care should be taken to express in a Historical Validity Area expression all possible combinations of appropriate areas where a UE has been located in the past, i.e. prior to arriving at the validity location area where the UE is currently located.

In particular, the Historical Validity Area may be modeled as an expression composed of a number of AND statements, which in turn may be composed of OR statements. Any statement can be negated, as well as the whole Historical Validity Area expression can also be negated. It is noted that it is possible to indicate the order in which validity areas are traversed by the UE. That is, if the Historical Validity Area indicates that the condition is true when the UE has traversed cells C1 and C2, if the UE traverses C2 and C1 (in that order), the condition would not be valid. Additionally, it is also possible to express a condition that comprises a number of cells that should be traversed in any order, that is, the condition comprises a group of cells.

For example, in the exemplary validity condition discussed above for the first ANDSF rule applying to solve the situation illustrated in FIG. 7, there were some trajectories that the user might have followed when arriving at the coverage of WLAN W1, for example:

C1, C2, C3
C1, C2, C3, C4

One may express the condition as: C1 AND C2 AND C3 (AND OPTIONALLY C4). Alternatively, the condition may be negated in order to express that the UE has not been following a particular trajectory. That is, the expression of the previous condition can be negated: NOT (C1 AND C2 AND C3 (AND OPTIONALLY C4)).

Due to, at least, the introduction of the Historical Validity Area, namely, the list of previous location areas where the UE had been located before arriving at the validity location area, the information transferred between the ANDSF server and the ANDSF client running in the UE has to be extended.

Therefore, the ANDSF Management Object (MO), which includes the set of ANDSF rules (conditions, statements, predicates) that determine the access network selection policy to be enforced by the UE, as defined in 3GPP TS 24.312, has to be correspondingly extended. In the following, extensions of the ANDSF MO are discussed.

3GPP TS 24.312 currently provides for a general purpose Validity Criteria container. This allows to express general conditions that are then referred to by ANDSF rules. The current Validity Criteria container in 3GPP TS 24.312 allows defining a validity location area, where the UE is currently located, or a time condition.

The present solution extends this Validity Criteria container illustrated in FIG. 9 by adding a Historical Validity Area container that allows including one or more Historical Validity Areas. Each Historical Validity Area, as exemplary illustrated in FIG. 10 and FIG. 11, contains a collection of previous location areas where the UE has been located (or not) in the near past. FIG. 9 shows a representation of the Validity Criteria container in the ANDSF MO, including the Historical Validity Area container proposed in this specification. The modifications with respect to current 3GPP TS 24.312 are highlighted in grey background in FIG. 9.

The Historical Validity Area container allows for expressing one or more instances of Historical Validity Areas. Each instance of a HistoricalValidityArea is represented as /ANDSF/ValidityCriteria/<X>/HistoricalValidityArea/<X> in FIG. 9 and any one of FIG. 10 and FIG. 11, where "<X>" is the mechanism used to represent "any name" for that node. An instance of a HistoricalValidityArea can be negated with the boolean value of the HVAIsNegated leaf.

Each Historical Validity Area is composed, for the purpose of the ANDSF MO, of a collection of Validity Areas, i.e. the previous location areas where the UE had been located as commented above, wherein each instance is represented in FIGS. 9 to 11 by /ANDSF/ValidityCriteria/<X>/HistoricalValidityArea/<X>Validity/<Area/<X>. Each Validity Area, i.e. each previous location area, can define a 3GPP Location, a 3GPP2 Location, a WiMax Location, a WLAN Location, or a Geographical Location. Each Validity Area that is part of the same Historical Validity Area may have a Sequence Order, a so-called SeqOrder in FIG. 10 and FIG. 11. The SeqOrder indicates the sequential order in which the UE must have been located in that Validity Area, i.e. in that previous location area, in order to make the condition valid. Lower absolute values may indicate Validity Areas earlier visited when compared with the current time at which the condition is being evaluated. Higher absolute values may indicate Validity Areas closer in time to the current time.

In an embodiment of the invention, the highest absolute value of the SeqOrder of a Validity Area may indicate the latest previous location area of the UE prior to arriving at the validity location area where the UE is currently located. This embodiment corresponds to considering that the validity condition comprises a validity location area, where the UE is currently located, and a list of previous location areas, where the UE has been located prior to arriving at the validity location area. This embodiment is more beneficial for backward compatibility.

In another embodiment, the validity condition may comprises a list that includes the previous location areas and the current location area. In this embodiment, the highest absolute value of the SeqOrder of a Validity Area may indicate the current location area where the UE is located.

If two or more Validity Areas, i.e. previous location areas, of the same Historical Validity Area are allocated a different SeqOrder, then an AND operation may be applied to each of the Validity Areas. This allows to express an ordered sequence of Validity Areas.

Still with reference to FIG. 10 and FIG. 11, a new Operation leaf may determine the boolean operation to be applied to all the Validity Areas, i.e. previous location areas, that share the same value of their SeqOrder leaf. The Operation leaf can take the values "AND" or "OR" in order to represent a conjunction boolean operation and a disjunction boolean operation, respectively.

For example, in order to express a group of two or more Validity Areas, i.e. previous location areas, that the UE should traverse, where the UE must traverse each of the Validity Areas in any sequence order, then two or more Validity Areas of the same Historical Validity Area should be configured with the same value of the SeqOrder and the Operation node set to "AND".

Conversely, in order to express a group of two or more Validity Areas, i.e. previous location areas, that the UE should traverse, where the UE must traverse at least one (any) of the Validity Areas, then two or more Validity Areas of the same Historical Validity Area should be configured with the same value of the SeqOrder and the Operation node set to "OR".

Negative statements may be indicated with the boolean leaves IsNegated set to true. Optional statements may be indicated with the boolean leaves IsOptional set to true.

The semantics of the Historical Validity Area container, as shown in FIG. 10 and FIG. 11, are: for this condition to become valid, the UE must have been previously located in each of the Validity Areas (or group of Validity Areas that share the same SeqOrder value) defined in the condition, according to the sequence order expressed by the SeqOrder value. The Operation, IsOptional, IsNegated, and HVAIsNegated leaves can modify the expression accordingly.

At this stage, and in order to add more level of detail to the scenarios represented in FIG. 6 and FIG. 7, it is desired to represent a Historical Validity Area of the train approaching the railway station from the bottom left side, so that the condition evaluates to true when the UE has not been visiting the validity areas, i.e. the previous location areas, in the expressed order. This requires a representation of a Historical Validity Area that is set to be valid when the UE has not been moving through the following cells (in sequence): C1, C2, C3, and optionally C4. The conditions need to represent the following trajectories:

NOT (C1, C2, C3)
NOT (C1, C2, C3, C4)

In view of the location areas plotted in FIG. 6 and FIG. 7, it is possible and valid that the UE, after having been located under the coverage area of cells C1 and C2, moves to the coverage area of cell C3. Additionally, the train may stop when the UE is still located under the coverage of cell C3, and the sequence of cells can be represented by this Historical Validity Area: C1, C2, C3 and optionally C4. However, the train may stop a bit further to the North, where the UE is located under the coverage of cell C4, and still be included in the same Historical Validity Area: C1, C2, C3 and optionally C4.

In other words, this condition can be expressed as:

NOT (C1 AND C2 AND C3 AND (OPTIONALLY C4))

Then, by using the table illustrated in FIG. 8 with exemplary identities that the relevant cells might have in a UTRAN network, a Historical Validity Area named HVA1 can be defined to represent a desired trajectory, as follows:

time (expressed in seconds) that the UE can be located in a given validity area for the condition of the HistoricalValidityArea to be true. For example, if the stop of all trains in this railway station last a maximum of 5 minutes, a value lightly higher than 300 seconds as MaxStationaryTime would make the HistoricalValidityArea to be false after 5 minutes from the train arrival.

Back to the ANDSF MO disclosed in 3GPP TS 24.312, and starting from the amendments illustrated in FIG. 9, the Validity Criteria container may be further extended, as illustrated in FIG. 11, to include the MaxStationaryTime leaf as an attribute of the HistoricalValidityArea instance. This MaxStationaryTime leaf corresponds to the maximum time that the UE can be located under each of the subordinated validity areas for the condition to be true and is the same for all these subordinated validity areas, i.e. previous location areas.

```
Beginning of the Historical Validity Area condition ####
-       /ANDSF/ValidityCriteria/VC1/HistoricalValidityArea/HVA1/
        HVAIsNegated = true
Beginning of C1 definition ####
-       /ANDSF/ValidityCriteria/VC1/HistoricalValidityArea/HVA1/ValidityArea/
        VA1/3GPP_Location/L1/PLMN = 214
-       /ANDSF/ValidityCriteria/VC1/HistoricalValidityArea/HVA1/ValidityArea/
        VA1/3GPP_Location/L1/LAC = 2828
-       /ANDSF/ValidityCriteria/VC1/HistoricalValidityArea/HVA1/ValidityArea/
        VA1/3GPP_Location/L1/UTRAN_CI = 00231
-       /ANDSF/ValidityCriteria/VC1/HistoricalValidityArea/HVA1/ValidityArea/
        VA1/SeqOrder = 1
Beginning of C2 definition ####
-       /ANDSF/ValidityCriteria/VC1/HistoricalValidityArea/HVA1/ValidityArea/
        VA2/3GPP_Location/L1/PLMN = 214
-       /ANDSF/ValidityCriteria/VC1/HistoricalValidityArea/HVA1/ValidityArea/
        VA2/3GPP_Location/L1/LAC = 2828
-       /ANDSF/ValidityCriteria/VC1/HistoricalValidityArea/HVA1/ValidityArea/
        VA2/3GPP_Location/L1/UTRAN_CI = 00154
-       /ANDSF/ValidityCriteria/VC1/HistoricalValidityArea/HVA1/ValidityArea/
        VA2/SeqOrder = 2
Beginning of C3 definition ####
-       /ANDSF/ValidityCriteria/VC1/HistoricalValidityArea/HVA1/ValidityArea/
        VA3/3GPP_Location/L1/PLMN = 214
-       /ANDSF/ValidityCriteria/VC1/HistoricalValidityArea/HVA1/ValidityArea/
        VA3/3GPP_Location/L1/LAC = 2828
-       /ANDSF/ValidityCriteria/VC1/HistoricalValidityArea/HVA1/ValidityArea/
        VA3/3GPP_Location/L1/UTRAN_CI = 04223
-       /ANDSF/ValidityCriteria/VC1/HistoricalValidityArea/HVA1/ValidityArea/
        VA3/SeqOrder = 3
Beginning of C4 definition ####
-       /ANDSF/ValidityCriteria/VC1/HistoricalValidityArea/HVA1/ValidityArea/
        VA4/3GPP_Location/L1/PLMN = 214
-       /ANDSF/ValidityCriteria/VC1/HistoricalValidityArea/HVA1/ValidityArea/
        VA4/3GPP_Location/L1/LAC = 2828
-       /ANDSF/ValidityCriteria/VC1/HistoricalValidityArea/HVA1/ValidityArea/
        VA4/3GPP_Location/L1/UTRAN_CI = 20192
-       /ANDSF/ValidityCriteria/VC1/HistoricalValidityArea/HVA1/ValidityArea/
        VA4/SeqOrder = 4
-       /ANDSF/ValidityCriteria/VC1/HistoricalValidityArea/HVA1/ValidityArea//
        VA4/IsOptional = true
```

Depending on the topology of the cellular network and the coverage that different cells offer over the railway station, there could be scenarios where a UE gets off the train and, even if it moves through the building, it still remains under the coverage of the last cell which was included in the condition to prevent the WLAN connection.

In order to facilitate that such UE, which is still in a cell that prevents the UE from connecting to WLAN, make it use of the WLAN W1 service offered at the railway station, an embodiment is provided for where the HistoricalValidityArea definition may be extended to add a so-called MaxStationaryTime leaf that indicates the maximum amount of However, there might be cases where it is necessary to specify a different maximum stationary time for each previous location area that composes the HistoricalValidityArea container. To this end and in accordance with an embodiment, there is provided a VAMaxStationaryTime leaf as an attribute of each ValidityArea, i.e. each previous location area, within the HistoricalValidityArea.

Both elements, MaxStationaryTime and VAMaxStationaryTime are complementary and, as illustrated in FIG. 11, both may be present simultaneously in the definition of a HistoricalValidityArea. The VAMaxStationaryTime affects a single ValidityArea, i.e. single previous location area, and has precedence over the MaxStationaryTime, which affects by default all the previous location areas of the HistoricalValidityArea.

Again back to the ANDSF MO specified in 3GPP TS 24.312, the existing Policy container, which is used to define ANDSF rules for devices that provide a single interface, may also be extended to add a so-called HistoricalValidityAreaRef leaf that contains a full URI identifying a HistoricalValidityArea node in the ANDSF MO management tree.

An exemplary HistoricalValidityAreaRef that points to the previous example of a HistoricalValidityArea may be defined as:
/ANDSF/Policy/P1/HistoricalValidityAreaRef=/ANDSF/ValidityCriteria/VC1/HistoricalValidityArea/HVA1

This expression indicates that Policy P1 has a condition expressed as the Historical Validity Area HVA1.

In an embodiment illustrated in FIG. 12, the Policy container of the ANDSF MO may thus be extended to add the HistoricalValidityArea container, so that the Policy container includes the HistoricalValidityArea container. Both extensions, i.e. HistoricalValidityArea and HistoricalValidityAreaRef, are shown in grey background color in FIG. 12. The contents of the HistoricalValidityArea container within the Policy container, which are not explicitly drawn in FIG. 12, may be any one of those exemplary illustrated in FIG. 10 and FIG. 11.

In an embodiment illustrated in FIG. 13, the HistoricalValidityArea and HistoricalValidityAreaRef containers may also be added to the existing ForFlowBased container of the ANDSF MO. Both extensions are shown in grey background color in FIG. 13. The contents of the HistoricalValidityArea container within the ForFlowBased container, which are not explicitly drawn in FIG. 13, may be any one of those exemplary illustrated in FIG. 10 and FIG. 11.

In an embodiment illustrated in FIG. 14, the HistoricalValidityArea and HistoricalValidityAreaRef containers may also be added to the existing ForServiceBased container of the ANDSF MO. Both extensions are shown in grey background color in FIG. 14. The contents of the HistoricalValidityArea container within the ForServiceBased container, which are not explicitly drawn in FIG. 14, may be any one of those exemplary illustrated in FIG. 10 and FIG. 11.

In an embodiment illustrated in FIG. 15, the HistoricalValidityArea and HistoricalValidityAreaRef containers may also be added to the existing ForNonSeamlessOffload container of the ANDSF MO. Both extensions are shown in grey background color in FIG. 15. The contents of the HistoricalValidityArea container within the ForNonSeamlessOffload container, which are not explicitly drawn in FIG. 15, may be any one of those exemplary illustrated in FIG. 10 and FIG. 11.

In an embodiment illustrated in FIG. 16, the HistoricalValidityArea and HistoricalValidityAreaRef containers may also be added to the existing ForInterAPNRouting container of the ANDSF MO. Both extensions are shown in grey background color in FIG. 16. The contents of the HistoricalValidityArea container within the ForInterAPNRouting container, which are not explicitly drawn in FIG. 16, may be any one of those exemplary illustrated in FIG. 10 and FIG. 11.

In an embodiment illustrated in FIG. 17, the HistoricalValidityArea and HistoricalValidityAreaRef containers may also be added to the existing WLANSP container of the ANDSF MO. Both extensions are shown in grey background color in FIG. 17. The contents of the HistoricalValidityArea container within the WLANSP container, which are not explicitly drawn in FIG. 17, may be any one of those exemplary illustrated in FIG. 10 and FIG. 11.

At this stage, an end-to-end example may be built up in the following with some embodiments already discussed above.

Assuming the operator has dictated a policy with the following semantics: The default access network policy for all the UEs in the network is to connect to an operator WLAN (if available), otherwise the UE should connect to the cellular network. If a UE is approaching the railway station in a train, the UE must not connect to WLAN in the railway station until the UE is located outside the train. To this end, two ANDSF rules, P1 and P2, are created with the following semantics:

ANDSF Rule #1 (very high priority):
Select WLAN W1 if Condition #1 and Condition #2 are valid.
Condition #1: Historical cell trajectory: Not have being located in (Cell C1 then Cell C2 then Cell C3 and then, optionally, Cell C4).
Condition #2: Historical cell trajectory: Not have being located in (Cell C5 then Cell C4 then, optionally, Cell C3).
ANDSF Rule #2 (lower priority):
Select cellular network.
Condition #1 is expressed:
NOT (C1 AND C2 AND C3 AND (OPTIONALLY C4))
Condition #2 is expressed:
NOT (C5 AND C4 AND (OPTIONALLY C3))

All these rules and conditions can be expressed with the following ANDSF MO (only relevant nodes are included):

```
Beginning of Policy P1 ####
-      /ANDSF/Policy/P1/RulePriority = 10
-      /ANDSF/Policy/P1/PrioritizedAccess/PA1/AccessTechnology = 3 (WLAN)
-      /ANDSF/Policy/P1/PrioritizedAccess/PA1/AccessId = Operator-WiFi-SSID
-      /ANDSF/Policy/P1/HistoricalValidityAreaRef =
       /ANDSF/ValidityCriteria/VC1/HistoricalValidityArea/HVA1
-      /ANDSF/Policy/P1/HistoricalValidityAreaRef =
       /ANDSF/ValidityCriteria/VC1/HistoricalValidityArea/HVA2
Beginning of Policy P2 ####
-      /ANDSF/Policy/P2/RulePriority = 200
-      /ANDSF/Policy/P2/PrioritizedAccess/PA1/AccessTechnology = 1 (3GPP
       cellular)
Beginning of Historical Validity Area 1 condition ####
-      /ANDSF/ValidityCriteria/VC1/HistoricalValidityArea/HVA1/
       HVAIsNegated = true
-      /ANDSF/
       ValidityCriteria/VC1/HistoricalValidityArea/HVA1/MaxStationaryTime =
       300
```

```
Beginning of C1 definition ####
-    /ANDSF/ValidityCriteria/VC1/HistoricalValidityArea/HVA1/ValidityArea/
     VA1/3GPP_Location/L1/PLMN = 214
-    /ANDSF/ValidityCriteria/VC1/HistoricalValidityArea/HVA1/ValidityArea/
     VA1/3GPP_Location/L1/LAC = 2828
-    /ANDSF/ValidityCriteria/VC1/HistoricalValidityArea/HVA1/ValidityArea/
     VA1/3GPP_Location/L1/UTRAN_CI = 00231
-    /ANDSF/ValidityCriteria/VC1/HistoricalValidityArea/HVA1/ValidityArea/
     VA1/SeqOrder = 1
Beginning of C2 definition ####
-    /ANDSF/ValidityCriteria/VC1/HistoricalValidityArea/HVA1/ValidityArea/
     VA2/3GPP_Location/L1/PLMN = 214
-    /ANDSF/ValidityCriteria/VC1/HistoricalValidityArea/HVA1/ValidityArea/
     VA2/3GPP_Location/L1/LAC = 2828
-    /ANDSF/ValidityCriteria/VC1/HistoricalValidityArea/HVA1/ValidityArea/
     VA2/3GPP_Location/L1/UTRAN_CI = 00154
-    /ANDSF/ValidityCriteria/VC1/HistoricalValidityArea/HVA1/ValidityArea/
     VA2/SeqOrder = 2
Beginning of C3 definition ####
-    /ANDSF/ValidityCriteria/VC1/HistoricalValidityArea/HVA1/ValidityArea/
     VA4/3GPP_Location/L1/PLMN = 214
-    /ANDSF/ValidityCriteria/VC1/HistoricalValidityArea/HVA1/ValidityArea/
     VA4/3GPP_Location/L1/LAC = 2828
-    /ANDSF/ValidityCriteria/VC1/HistoricalValidityArea/HVA1/ValidityArea/
     VA4/3GPP_Location/L1/UTRAN_CI = 04223
-    /ANDSF/ValidityCriteria/VC1/HistoricalValidityArea/HVA1/ValidityArea/
     VA4/SeqOrder = 3
Beginning of C4 definition ####
-    /ANDSF/ValidityCriteria/VC1/HistoricalValidityArea/HVA1/ValidityArea/
     VA5/3GPP_Location/L1/PLMN = 214
-    /ANDSF/ValidityCriteria/VC1/HistoricalValidityArea/HVA1/ValidityArea/
     VA5/3GPP_Location/L1/LAC = 2828
-    /ANDSF/ValidityCriteria/VC1/HistoricalValidityArea/HVA1/ValidityArea/
     VA5/3GPP_Location/L1/UTRAN_CI = 20192
-    /ANDSF/ValidityCriteria/VC1/HistoricalValidityArea/HVA1/ValidityArea/
     VA5/SeqOrder = 4
-    /ANDSF/ValidityCriteria/VC1/HistoricalValidityArea/HVA1/ValidityArea/
     VA5/IsOptional = true
Beginning of Historical Validity Area 2 condition ####
-    /ANDSF/ValidityCriteria/VC1/HistoricalValidityArea/HVA2/
     HVAIsNegated = true
-    /ANDSF/
     ValidityCriteria/VC1/HistoricalValidityArea/HVA2/MaxStationaryTime =
     300
Beginning of C5 definition ####
-    /ANDSF/ValidityCriteria/VC1/HistoricalValidityArea/HVA2/ValidityArea/
     VA1/3GPP_Location/L1/PLMN = 214
-    /ANDSF/ValidityCriteria/VC1/HistoricalValidityArea/HVA2/ValidityArea/
     VA1/3GPP_Location/L1/LAC = 2828
-    /ANDSF/ValidityCriteria/VC1/HistoricalValidityArea/HVA2/ValidityArea/
     VA1/3GPP_Location/L1/UTRAN_CI = 12031
-    /ANDSF/ValidityCriteria/VC1/HistoricalValidityArea/HVA2/ValidityArea/
     VA1/SeqOrder = 1
Beginning of C4 definition ####
-    /ANDSF/ValidityCriteria/VC1/HistoricalValidityArea/HVA2/ValidityArea/
     VA2/3GPP_Location/L1/PLMN = 214
-    /ANDSF/ValidityCriteria/VC1/HistoricalValidityArea/HVA2/ValidityArea/
     VA2/3GPP_Location/L1/LAC = 2828
-    /ANDSF/ValidityCriteria/VC1/HistoricalValidityArea/HVA2/ValidityArea/
     VA2/3GPP_Location/L1/UTRAN_CI = 20192
-    /ANDSF/ValidityCriteria/VC1/HistoricalValidityArea/HVA2/ValidityArea/
     VA2/SeqOrder = 2
Beginning of C3 definition ####
-    /ANDSF/ValidityCriteria/VC1/HistoricalValidityArea/HVA2/ValidityArea/
     VA3/3GPP_Location/L1/PLMN = 214
-    /ANDSF/ValidityCriteria/VC1/HistoricalValidityArea/HVA2/ValidityArea/
     VA3/3GPP_Location/L1/LAC = 2828
-    /ANDSF/ValidityCriteria/VC1/HistoricalValidityArea/HVA2/ValidityArea/
     VA3/3GPP_Location/L1/UTRAN_CI = 04223
-    /ANDSF/ValidityCriteria/VC1/HistoricalValidityArea/HVA2/ValidityArea/
     VA3/SeqOrder = 3
-    /ANDSF/ValidityCriteria/VC1/HistoricalValidityArea/HVA2/ValidityArea//
     VA3/IsOptional = true
```

Assuming now the first UE 2*a* and the second UE 2*b* shown in FIG. 6 and FIG. 7, which were on board the train approaching the railway station from the bottom left side, once the train stops at the railway station, as shown in FIG. 7, the first UE 2*a* gets off the train at the railway station and continues walking through the station and other buildings, whereas the second UE 2*b* continues onboard the train towards the next station. Both first UE 2*a* and second UE 2*b* are loaded with the above policies P1 and P2 of the ANDSF MO, which express the ANDSF rule #1 and ANDSF rule #2 previously discussed.

As illustrated in FIG. 6, while both first UE 2*a* and second UE 2*b* are located in the train, they pass through the locations of cells C1 and C2. At this point in time, since the first UE 2*a* and second UE 2*b* have not reached cell C3, both of the Historical Validity Areas HVA1 and HVA2 evaluate as true (remember that these conditions are negated, so if the first UE 2*a* and second UE 2*b* have not been located in the complete trajectory, the expression evaluates to true). This makes policy P1 valid, which has the highest priority. Policy P1 selects the operator's Wi-Fi WLAN W1. However, there is no coverage of operator's WLAN W1 overlapped with the location of cells C1 and C2. The ANDSF client then inspects a policy with lower priority, in this example, policy P2. This policy unconditionally selects the cellular network. Therefore, both first UE 2*a* and second UE 2*b* continue attached to the cellular network while the train is moving along the coverage area of cells C1 and C2.

Then both first UE 2*a* and second UE 2*b* arrive at the railway station, as illustrated in FIG. 7. Assume that the train stops where both first UE 2*a* and second UE 2*b* are covered by cell C3. Both first UE 2*a* and second UE 2*b* have been located through C1, C2, and C3. Therefore, the condition HVA1 no longer evaluates to true (since it is negated). Consequently HVA1 evaluates to false, policy P1 is invalid, and not considered. Policy P2 is enforced, making both first UE 2*a* and second UE 2*b* be still attached to the cellular network.

The first UE 2*a* moves inside the railway station, still being covered by cell C3, therefore, enforcing policy P2 and attached to the cellular network. If the first UE 2*a* stays in the railway station building, once the first UE 2*a* has been located under the coverage of cell C3 for more than 300 seconds (5-minute gap counting from the train entry in the coverage area of C3 until the train departure towards next railway station), the timer MaxStationaryTime in HVA1 expires and the HVA1 condition will evaluate to true (due to negative logic). Condition HVA2 is also true, since the first UE 2*a* has not been recently located through the northbound cells. Since both HVA1 and HVA2 are true, policy P1 is valid. And, since this policy selects the Operator's Wi-Fi WLAN W1 and the first UE 2*a* is located in an area of coverage of it, the first UE 2*a* will attach to this WLAN W1.

Alternatively or complementary to using the timer MaxStationaryTime, if the first UE 2*a* moves outside the railway station, the first UE 2*a* would enter the location determined by either Cell C6 or C7, making both HVA1 and HVA2 conditions true and making policy P1 valid. Therefore, the first UE 2*a* will try to attach to the Operator's Wi-Fi WLAN W1. If there is no coverage for WLAN W1, policy P2 will be enforced, making the first UE 2*a* attach to the cellular network.

On the other hand, as long as the stop at the train station is short, so that the second UE 2*b* does not remain under the coverage of Cell C3 or Cell C4 for more than 5 minutes (MaxStationaryTime is defined 300 seconds), then both conditions HVA1 and HVA2 will evaluate to false, invalidating policy P1 and making the second UE 2*b* enforce policy P2, which keeps the second UE 2*b* attached to the cellular network.

The invention may also be practiced by respective computer programs for the ANDSF server and the ANDSF client. To this end, there is provided a computer program 162, comprising instructions which, when executed on at least one processor 150 of the ANDSF server, cause the at least one processor to carry out the method for instructing a UE on selection of an access network amongst a plurality of access networks. This computer program 162 may be loaded in a computer program product 190. Also to this end, there is provided a computer program 214, comprising instructions which, when executed on at least one processor 220 of the UE, cause the at least one processor to carry out the method for selecting an access network for a UE amongst a plurality of access networks. This computer program 162 may be loaded in a computer program product 250.

The invention allows operators to dictate ANDSF rules that prevent short and unneeded handovers to WLAN and back to cellular. This mitigates a number of problems derived from unneeded transmission/reception signaling during attachment, authentication, and IP acquisition phases.

Amongst the advantages provided for by the present solution, one may cite: battery savings in the UE due to unneeded transmission of data over the air interface; air interface traffic savings by avoiding attachment, authentication, authorization, and IP address acquisition; network congestion avoidance due to unneeded transmission of data over the air interface; no service interruption, e.g. due to a change in IP address, relieving the ANDSF server from keeping track of individual UEs and the need for predicting trajectories for each of the users in the network, facilitating the scalability of the solution.

In this respect, the main load from tracking trajectories and applying corresponding ANDSF rules is on the ANDSF client and not on the ANDSF server.

As used throughout the present specification, the word "comprising" does not exclude the presence of other elements or steps than those listed and the words "a" or "an" preceding an element do not exclude the presence of a plurality of such elements.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of selecting an access network for a user equipment, UE, amongst a plurality of access networks, the method comprising the steps of:
   defining at an Access Network Discovery and Selection Function, ANDSF, server an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas;
   transmitting the ANDSF rule, which comprises the validity location area and the validity trajectory, from the ANDSF server to an ANDSF client of the UE;

tracking, at the ANDSF client, a historical trajectory for the UE by storing a list with one or more successive location areas where the UE has been located; and in response to matching a current location of the UE with the validity location area received from the ANDSF server, and matching the historical trajectory tracked at the ANDSF client for the UE with the validity trajectory received from the ANDSF server, determining that the validity condition is fulfilled and applying the ANDSF rule at the ANDSF client.

2. The method of claim 1, wherein applying the ANDSF rule comprises either switching or not switching between the first and the second access network.

3. The method of claim 1, wherein the list with one or more previous location areas included in the validity trajectory comprises any one of: a number of sequential location areas, a number of grouped location areas in any order, and combinations thereof.

4. The method of claim 1, wherein the list with one or more previous location areas included in the validity trajectory comprises optional location areas that the tracked historical trajectory for the UE may or may not include without affecting the fulfillment of the validity condition.

5. The method of claim 1, further comprising:
defining at the ANDSF server a maximum time value during which the validity condition is true for the ANDSF rule; and
monitoring the ANDSF rule and, upon expiry of the maximum time value, determining that the validity condition is not fulfilled and the ANDSF rule is no longer valid at the ANDSF client.

6. The method of claim 1, further comprising:
defining at the ANDSF server one or more further ANDSF rules to be selectively applied for selection of an access network between the first and the second access network, and wherein each further ANDSF rule comprises one or more validity conditions to fulfil for the further ANDSF rule to be applied; and
transmitting the one or more further ANDSF rules from the ANDSF server to the ANDSF client of the UE.

7. The method of claim 6, further comprising, if the validity condition of the ANDSF rule is not fulfilled, determining at the ANDSF client whether other validity conditions for the ANDSF rule and for the one or more further ANDSF rules may alternatively be applied to the UE until all ANDSF rules have been checked.

8. An Access Network Discovery and Selection Function, ANDSF, server for selecting an access network for a user equipment, UE, amongst a plurality of access networks, the ANDSF server comprising:
memory storing instructions; and
a processor operable to execute the instructions to cause the ANDSF server to:
define an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas;
transmit the ANDSF rule, which comprises the validity location area and the validity trajectory, to an ANDSF client of the UE for matching, at the ANDSF client, the received validity location area with a current location of the UE, and the received validity trajectory with a historical trajectory tracked at the ANDSF client for the UE.

9. The ANDSF server of claim 8, wherein the list with one or more previous location areas included in the validity trajectory comprises any one of: a number of sequential location areas, a number of grouped location areas in any order, and combinations thereof.

10. The ANDSF server of claim 8, wherein the list with one or more previous location areas included in the validity trajectory comprises optional location areas not affecting the fulfillment of the validity condition.

11. The ANDSF server of claim 8, wherein:
the rules handler is configured to define a maximum time value during which the validity condition is true for the ANDSF rule; and
the transmitter is configured to transmit, to the ANDSF client, the maximum time value during which the validity condition is true for the ANDSF rule.

12. The ANDSF server of claim 8, wherein the rules handler is configured to define one or more further ANDSF rules to be selectively applied for selection of an access network between the first and the second access network, wherein each further ANDSF rule comprises one or more validity conditions to fulfil for the further ANDSF rule to be applied, and wherein the transmitter is configured to transmit the one or more further ANDSF rules to the ANDSF client.

13. A user equipment, UE, comprising:
an Access Network Discovery and Selection Function, ANDSF, client for selecting an access network amongst a plurality of access networks;
a receiver configured to receive, from an ANDSF server, an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas;
wherein the ANDSF client comprises a tracker configured to track a historical trajectory for the UE, by storing in a memory a list with one or more successive location areas where the UE has been located; and
wherein the ANDSF client comprises a rules handler configured to
in response to matching a current location of the UE with the validity location area received from the ANDSF server, and matching the historical trajectory tracked at the ANDSF client for the UE with the validity trajectory received from the ANDSF server, determine that the validity condition is fulfilled and apply the ANDSF rule.

14. The UE of claim 13, wherein the rules handler, in applying the ANDSF rule, is configured to trigger either switching or not switching between the first and the second access network, in accordance with the ANDSF rule.

15. The UE of claim 13, wherein the list with one or more previous location areas included in the validity trajectory comprises any one of: a number of sequential location areas, a number of grouped location areas in any order, and combinations thereof.

16. The UE of claim 13, wherein the list with one or more previous location areas included in the validity trajectory comprises optional location areas that the tracked historical trajectory for the UE may or may not include without affecting the fulfillment of the validity condition.

17. The UE of claim 13, wherein:
the receiver is configured to receive, from the ANDSF server, a maximum time value during which the validity condition is true for the ANDSF rule; and
the rules handler is configured to monitor the ANDSF rule and, upon expiry of the maximum time value, determine that the validity condition is not fulfilled and the ANDSF rule is no longer valid.

18. The UE of claim 13, wherein the receiver is configured to receive, from the ANDSF server, one or more further ANDSF rules to be selectively applied for selection of an access network between the first and the second access network, and wherein each further ANDSF rule comprises one or more validity conditions to fulfil for the ANDSF rule to be applied.

19. The UE of claim 18, wherein the rules handler is further configured, if the validity condition of the ANDSF rule is not fulfilled, to determine whether other validity conditions for the ANDSF rule and for the one or more further ANDSF rules may alternatively be applied to the UE until all ANDSF rules have been checked.

20. A method of selecting an access network for a user equipment, UE, amongst a plurality of access networks, the method carried out at an Access Network Discovery and Selection Function, ANDSF, server and comprising the steps of:
defining an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas;
transmitting the ANDSF rule, which comprises the validity location area and the validity trajectory, to an ANDSF client of the UE for matching, at the ANDSF client, the received validity location area with a current location of the UE, and the received validity trajectory with a historical trajectory tracked at the ANDSF client for the UE.

21. The method of claim 20, wherein the list with one or more previous location areas included in the validity trajectory comprises any one of: a number of sequential location areas, a number of grouped location areas in any order, and combinations thereof.

22. The method of claim 20, wherein the list with one or more previous location areas included in the validity trajectory comprises optional location areas not affecting the fulfillment of the validity condition.

23. The method of claim 20, further comprising:
defining a maximum time value during which the validity condition is true for the ANDSF rule; and
transmitting, to the ANDSF client, the maximum time value during which the validity condition is true for the ANDSF rule.

24. The method of claim 20, further comprising:
defining one or more further ANDSF rules to be selectively applied for selection of an access network between the first and the second access network, wherein each further ANDSF rule comprises one or more validity conditions to fulfil for the further ANDSF rule to be applied; and
transmitting the one or more further ANDSF rules to the ANDSF client.

25. A method of selecting an access network for a user equipment, UE, amongst a plurality of access networks, the method carried out at an Access Network Discovery and Selection Function, ANDSF, client and comprising the steps of:
receiving, from an ANDSF server, an ANDSF rule to be applied for selection of an access network between a first and a second access network, wherein the ANDSF rule comprises a validity condition to be fulfilled for the ANDSF rule to be applied, wherein the validity condition comprises a validity location area and a validity trajectory towards the validity location area, and wherein the validity trajectory comprises a list with one or more previous location areas;
tracking a historical trajectory for the UE by storing a list with one or more successive location areas where the UE has been located; and
in response to matching a current location of the UE with the validity location area received from the ANDSF server, and matching the historical trajectory tracked at the ANDSF client for the UE with the validity trajectory received from the ANDSF server, determining that the validity condition is fulfilled and applying the ANDSF rule.

26. The method of claim 25, wherein applying the ANDSF rule comprises either switching or not switching between the first and the second access network.

27. The method of claim 25, wherein the list with one or more previous location areas included in the validity trajectory comprises any one of: a number of sequential location areas, a number of grouped location areas in any order, and combinations thereof.

28. The method of claim 25, wherein the list with one or more previous location areas included in the validity trajectory comprises optional location areas that the tracked historical trajectory for the UE may or may not include without affecting the fulfillment of the validity condition.

29. The method of claim 25, further comprising:
receiving, from the ANDSF server, a maximum time value during which the validity condition is true for the ANDSF rule; and
monitoring the ANDSF rule and, upon expiry of the maximum time value, determining that the validity condition is not fulfilled and the ANDSF rule is no longer valid.

30. The method of claim 25, further comprising receiving, from the ANDSF server, one or more further ANDSF rules to be selectively applied for selection of an access network between the first and the second access network, and wherein each further ANDSF rule comprises one or more validity conditions to fulfil for the ANDSF rule to be applied.

31. The method of claim 30, further comprising, if the validity condition of the ANDSF rule is not fulfilled, determining whether other validity conditions for the ANDSF rule and for the one or more further ANDSF rules may alternatively be applied to the UE until all ANDSF rules have been checked.

* * * * *